US006724968B2

(12) United States Patent
Lackritz et al.

(10) Patent No.: US 6,724,968 B2
(45) Date of Patent: Apr. 20, 2004

(54) PHOTODEFINITION OF OPTICAL DEVICES

(75) Inventors: Hilary S. Lackritz, Cupertino, CA (US); William K. Bischel, Menlo Park, CA (US); Tony C. Kowalczyk, Palo Alto, CA (US); Simon J. Field, Palo Alto, CA (US); Travis P. S. Thoms, San Lorenzo, CA (US); Yeong-Cheng Lee, Santa Clara, CA (US)

(73) Assignee: Gemfire Corporation, Fremont, CA (US)

( * ) Notice: Subject to any disclaimer, the term of this patent is extended or adjusted under 35 U.S.C. 154(b) by 0 days.

(21) Appl. No.: 09/728,766

(22) Filed: Dec. 1, 2000

(65) Prior Publication Data

US 2001/0031122 A1 Oct. 18, 2001

Related U.S. Application Data

(60) Provisional application No. 60/168,572, filed on Dec. 2, 1999.

(51) Int. Cl.[7] .................................................. G02B 6/10
(52) U.S. Cl. ........................................ 385/131; 385/141
(58) Field of Search ............................... 385/124, 130, 385/131, 132, 141, 142, 144, 56, 57.1

(56) References Cited

U.S. PATENT DOCUMENTS

| | | | | |
|---|---|---|---|---|
| 3,809,696 A | | 5/1974 | Porret et al. | ........... 260/256.4 C |
| 3,809,732 A | | 5/1974 | Chandross et al. | ............. 264/22 |
| 3,953,620 A | * | 4/1976 | Chandross et al. | ........... 427/520 |

(List continued on next page.)

FOREIGN PATENT DOCUMENTS

| EP | 0 412 675 A2 | 2/1991 |
|---|---|---|
| EP | 0 616 234 A2 | 9/1994 |
| EP | 0 689 094 A1 | 12/1995 |
| GB | 2 191 603 A | 12/1987 |
| WO | WO 92/00185 | 1/1992 |
| WO | WO 85/45759 | 10/1998 |

OTHER PUBLICATIONS

P.R. Ashley and E.A. Sornsin, "Doped optical claddings for waveguide devices with electrooptical polymers", *IEEE Photonics Technology Letters*, vol. 4, No. 9, Sep. 1992, pp. 1026–1028.
B.L. Booth et al., "Polyguide™ polymeric technology for optical interconnect circuits and components", *SPIE*, vol. 3005, pp. 238–251.
W.S. Colburn and K.A. Haines, "Volume hologram formation in photopolymer materials", *Applied Optics*, vol. 10, No. 7, Jul. 1971, pp. 1636–1641.
J.E. Marchegiano et al., "Polyguide™ technology for passive optical interconnects". *SPIE*, vol. 2690, pp. 361–368.
G.B. McKenna, Chapter 10: Glass formation and glassy behavior, *vol. 2: Polymer Properties*, C. Booth and C. Price (vol. eds.), *Comprehensive Polymer Science: the synthesis, characterization, reactions & applications of polymers*, Sir Geoffrey Allen and J.C. Bevington (chairman and deputy chairman of the ed. board), Pergamon Press, Oxford (1989).
Robert H. Wopshall, "MB16. Dry photopolymer film for recording holograms", abstract of presentation, 1971 Spring Meeting, *Journal of the Optical Society of America*, vol. 61, 1971, p. 649.
Joshi, et al., "Three Dimensional Optical Circuitry Using Two–Photon–Assisted Polymerization," Applied Physics Letters, Jan. 11, 1999, vol. 74, No. 2, pp. 170–172.

*Primary Examiner*—Frank G. Font
*Assistant Examiner*—Kaveh C Kianni

(57) ABSTRACT

An optical structure is fabricated by forming an active layer including a photodefinable material on a substrate or on another underlying layer, forming an upper layer above the active layer, and then patterning the active layer by selective application of radiation through the upper layer. The upper layer is substantially transparent to radiation of the type required to activate the photodefinable material in the active layer.

23 Claims, 9 Drawing Sheets

U.S. PATENT DOCUMENTS

| | | | |
|---|---|---|---|
| 3,993,485 A | * 11/1976 | Chandross et al. | 385/141 |
| 4,712,854 A | * 12/1987 | Mikami et al. | 385/143 |
| 5,009,483 A | 4/1991 | Rockwell, III | 350/96.24 |
| 5,121,462 A | * 6/1992 | Fabre et al. | 385/143 |
| 5,159,699 A | 10/1992 | de Monts | |
| 5,402,514 A | * 3/1995 | Booth et al. | 385/130 |
| 5,544,268 A | 8/1996 | Bischel et al. | 385/4 |
| 5,874,187 A | * 2/1999 | Colvin et al. | 430/2 |
| 5,932,397 A | * 8/1999 | Mustacich | 430/321 |
| 6,035,083 A | 3/2000 | Brennan, III et al. | 385/37 |

* cited by examiner

PHOTODEFINITION OF OPTICAL DEVICES

This application claims the benefit of U.S. Provisional Application No. 60/168,572, filed Dec. 2, 1999 and incorporated herein by reference.

This invention was made with Government support under Contract No. N61331-96-C-0036 awarded by the U.S. Navy, Naval Surface Warfare Center. The Government has certain rights in the invention.

BACKGROUND OF THE INVENTION

1. Field of the Invention

This invention relates to methods for producing optical waveguides, and other such components or devices which require patterns of altered index of refraction or thickness in transparent polymer multilayer structures. In particular this invention relates to methods for producing such optical waveguides, and other such components or devices upon irradiation with actinic radiation and subsequent treatment. These optical waveguides, and other such components or devices may be used in fields ranging, for example, from telecommunications, to optical computing, data storage, displays, and sensors.

2. Description of Related Art

Current technology for manufacturing polymer optical waveguides includes techniques well known in the art, such as, for example, reactive ion etching (RIE) or laser ablation of the core or cladding layers to provide rib waveguides, ion implantation, or photobleaching of the core or cladding layers. In addition, optical waveguides can be formed by photodefinition, a process in which a layer of organic material, for example a polymer, is deposited on another layer of material, and predetermined regions of the polymer layer are subjected to actinic radiation in order to alter the refractive index of these regions.

The first step in the photodefinition process is the deposition of one or more transparent photosensitive monomers onto a substrate. The chosen monomers are selected on the basis of their ability to dimerize or polymerize upon exposure to light and their relative indices of refraction. When such monomers are subsequently irradiated with a pattern of light, for example ultraviolet (UV) light, polymerization is initiated in the exposed material. Since the polymer is formed from reacted monomers, monomer concentration is depleted in the irradiation region, creating a gradient in chemical potential between the exposed and the unexposed areas. The resulting gradients are unstable, and the smaller-molecular-weight monomers surrounding the photochemically reacted material will diffuse as much as possible into the polymerized regions, increasing the index and creating a feature in the planar layer. At least a single, subsequent exposure of the entire material system to high-intensity UV or thermal radiation, for example, may be used to complete the process. This fixing step polymerizes all remaining reactants, creating a system that is effectively fully cured and inert. An important aspect of this procedure is that the resulting physical density in the patterned (exposed) regions is either higher or lower than in the unpatterned material. This density difference causes an associated difference in index of refraction. Importantly for photonic devices, this index change is stable against further processing and pronounced enough to enable efficient waveguiding. A process of creating optical waveguides by photoinduced diffusion is described by Chandross et al. (U.S. Pat. Nos. 3,809,732; 3,809,696; 3,993,485, and; 3,953,620, all of which are incorporated herein by reference) and has been used extensively to create photonic devices.

It should be noted that photo-imaging might also be considered to be a form of photodefinition. In this process, an imaging layer is deposited on a substrate, and an image transferred into the surface of or throughout the entire imaging layer. The imaging layer in this instance would contain the photosensitive molecules. This technique would enable, for example, a waveguide to be fabricated by coating a substrate/lower cladding layer with photoresist or electron beam sensitive material such as PMMA, impinging light from a suitable light source (e.g., light in an ultraviolet region) upon a photomask having a predetermined pattern to transfer the pattern to the photoresist, and developing the photoresist to provide photoresist having the predetermined pattern. In this case, the predetermined pattern is the pattern for the rib/core of the waveguide, and material from the imaging layer has been removed to leave the free-standing feature. The waveguide fabrication is completed by depositing additional layer(s) over the patterned rib/core layer, these layers being additional core or cladding layers. It will be appreciated, that the optical feature, or rib, described here, is not dependent upon diffusion for its definition.

To applicants' knowledge, the prior art of photodefinition of polymer optical waveguides requires that the photodefinition process occur effectively immediately following the deposition of the photodefinable layer, and before deposition of the upper cladding layer, unless this is to be the photodefined layer. Consequently the photodefinition process necessitates that the layer coating/deposition process be interrupted and intermediate photodefinition processes or other processing and treatment effected before coating is finally resumed to complete manufacture of the device. Interruption of the coating process to perform photodefinition may ultimately lead to higher loss waveguides due to dust or dirt being deposited either at, or in close proximity to, the optical layer during processing, and a greater chance of the generation of defects in or near the optical layer due to the number of photodefinition processing steps that must be performed directly thereon.

FIGS. 1a to 1d illustrates schematically the technique by which photodefinition is conventionally practiced in the prior art. As shown in FIG. 1 a, the lower cladding 102 is deposited on the substrate 103 and cured, and a core layer 104 is then deposited over the lower cladding 102. The core layer 104 is then optically patterned, for example by photodefinition, as illustrated in FIG. 1c. In this example the optical patterning is lithographic, in which radiation 105 projected through a mask 106 is used to pattern the optical elements. Alternatively the exposure can result in a chemical change followed by removal of residual polymer/monomer using a wet etch, laser ablation, or further processing, to leave a rib waveguide (not shown). This step produces an area of elevated or reduced refractive index, 108, FIG. 1c. If necessary, the core layer is then locked or stabilized using suitable thermal or radiation exposure processing such that further refractive index change is unattainable. An upper cladding layer 110 is then deposited and cured, as indicted by FIG. 1d. It will be apparent that in this process, the layer 104 to be patterned, is processed to achieve photodefinition before subsequent layer(s) 110 are applied. This interruption in the layer coating process may ultimately lead to higher loss waveguides due to dust or dirt being deposited either at, or in close proximity to, the core/upper cladding interface during the photodefinition processing steps, or in processing, planarization or uniformity problems. It should be noted that the terms upper and lower are used herein solely for convenience in referring to specific layers. The layers they refer to are not intended to change if the structure is turned upside down or tilted.

The present invention provides optical waveguides, components or devices that may be defined after a complete optical multilayer structure/stack has been deposited. In addition, the utilization of multiple photosensitive molecules enables the required change in index for waveguide fabrication and increased ease of processing (e.g., fewer processing steps, better adhesion). Furthermore, the invention allows for a continuous or progressive fabrication process to be considered, enabling the reduction, if not the elimination, of the need to interrupt the coating process to perform waveguide photodefinition and/or not requiring the interruption of a continuous (roll) manufacturing multilayer structure/stack deposition process. Utilization of the current invention enables several advantages to be realized. These advantages include, for example, the following: lower loss waveguides due to less dust/dirt being deposited in, or in close proximity to, the optical layer during processing; the option for the deposition/coating processing to be performed independently from waveguide photo-patterning and the potential for increased ease of overall processing including a decreased number of fabrication steps and improved interlayer adhesion as a result of the uninterrupted layer coating process. This invention also has the flexibility to be used to position and create channel waveguides exactly where required within a multilayer structure to interconnect components.

SUMMARY OF THE INVENTION

According to the invention, roughly described, an optical structure is fabricated by forming an active layer including a photodefinable material on a substrate or on another underlying layer, forming an upper layer above the active layer, and then patterning the active layer by selective application of radiation through the upper layer. The upper layer is substantially transparent to radiation of the type required to activate the photodefinable material in the active layer.

BRIEF DESCRIPTION OF THE DRAWINGS

The invention may be more fully understood from the following detailed description thereof taken in connection with the accompanying drawings which form a part of this application and in which.

DETAILED DESCRIPTION

Figure 1A:
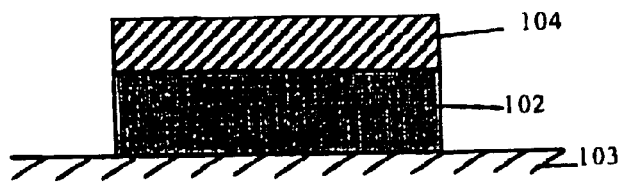
FIGS. 1a–1d (collectively FIG. 1) is a schematic outline of the methods steps of a conventional photodefinition process.
Figure 1B:
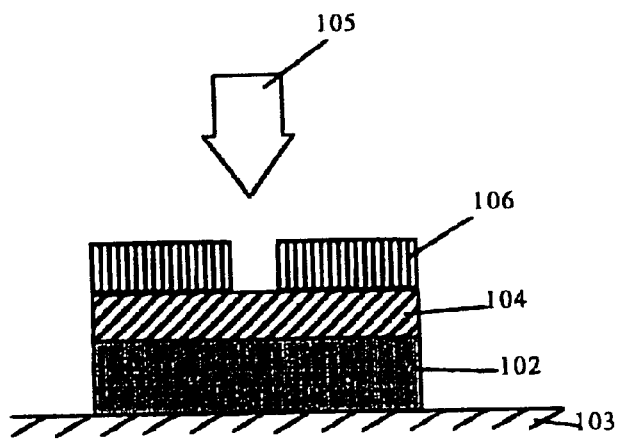
Figure 1C:
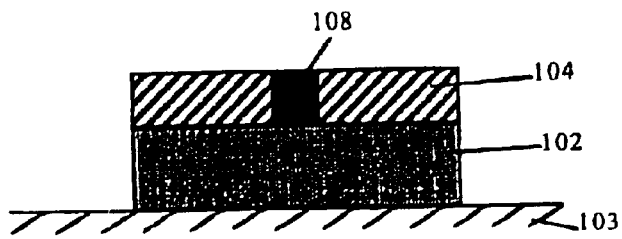
Figure 1D:
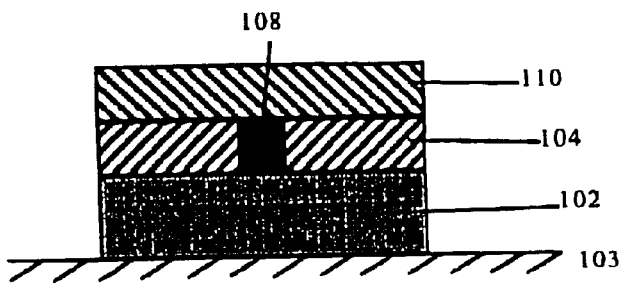
Figure 2A:
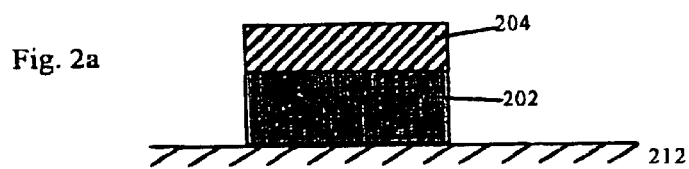
FIGS. 2a–2e (collectively FIG. 2) is a schematic outline of methods steps that may be used to implement the current invention.
Figure 2B:
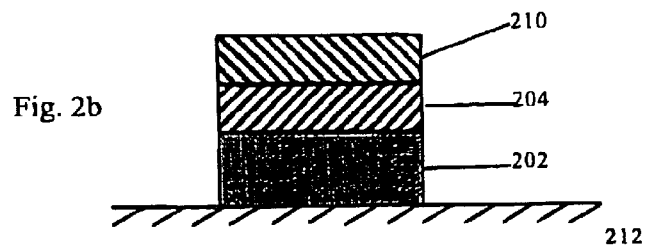
Figure 2C:
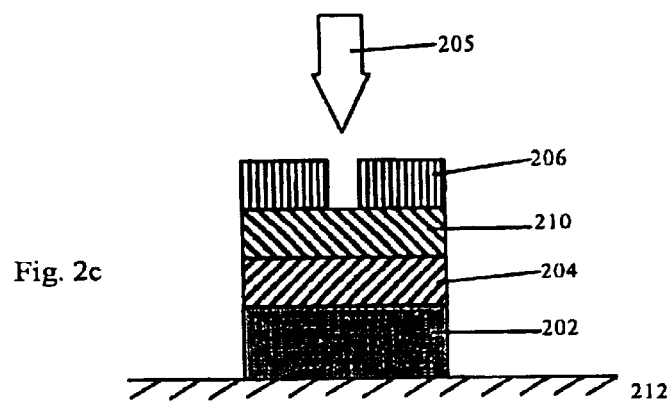
Figure 2D:
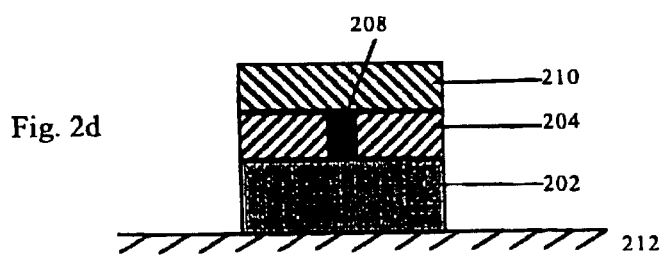
Figure 2E:
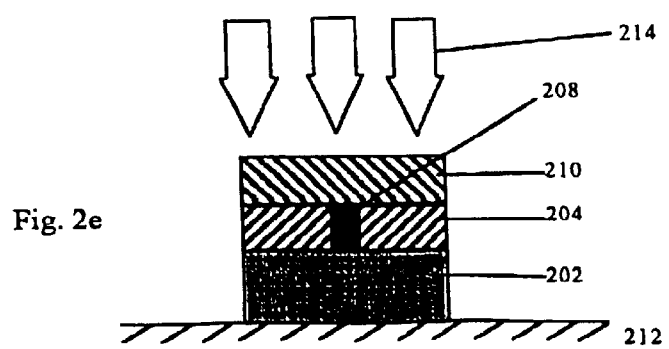

A schematic representation of an embodiment of the current invention is illustrated in FIGS. 2a to 2e. In essence, the figures show a process in which an interior layer of an optical multiple layer stack is photodefined in the presence of at least one over-layer and an optional under-layer. The layer that is ultimately to be photodefined is therefore "protected" during the photodefinition process from the incorporation of dust or other foreign bodies, the creation of extrinsic surface flaws and consequently has the potential to support lower loss optical waveguides. In addition, an uninterrupted layer coating process offers the prospect of improved interlayer adhesion properties. The lower number of defects attainable by such processing ultimately leads to fewer failure modes, higher yield of fabricated optical waveguides and an improved product quality.

Implementation of the process illustrated in FIG. 2 involves an interior layer polymer chemistry system that satisfies two general requirements: firstly the interior layer should be stable enough to have an upper layer placed over it, and be coated on a lower layer if desired; secondly, that it remain active enough to be controllably patterned, even after the upper layer has been placed over it.

In accordance with an embodiment of this invention, the process for creating an optical polymeric waveguide may comprise the steps of: (a) creating an optical multiple layer stack, mechanically and chemically stabilized; (b) patterning with radiation, for example UV light, to activate a plurality of photosensitive molecules such that they enable an optical device to be defined; and (c) locking the final structure permanently with radiation to substantially prevent future unwanted refractive index changes.

In accordance with the preferred embodiment of this invention, the process for creating an optical polymeric waveguide may comprise the steps of: (a) creating an optical multiple layer stack, mechanically and chemically stabilized e.g. by activating a first type of photosensitive molecule by exposure to a first wavelength, which may be, for example, visible light, causing sufficient linking of the polymer molecules to at least prevent the layers of the stack from flowing; (b) patterning with a second wavelength of light, for example with ultraviolet (UV) light, the second wavelength activating a second type of photosensitive molecule which enable an optical waveguide to be defined; (c) optionally enhancing the diffusion or crosslinking process by, for example, baking the optical stack; and (d) locking the final structure permanently, with a third wavelength of light, a wavelength which may be different from the second wavelength used, for example with ultraviolet light. The aim of this step is to activate at least any of the first type of photosensitive molecule, and preferably any of the second type of photosensitive molecule that have not previously been activated, effectively locking the final structure and substantially preventing future unwanted refractive index changes. These steps are illustrated schematically in FIG. 2.

Creating an Optical Multiple Layer Stack

In this embodiment of the invention, the optical multilayer stack is constructed by forming one layer on top of the next. The optically transparent polymer lower cladding layer 202 lies on an optional substrate 212. This support prevents mechanical failure of the film, such as breakage or wrinkling that would affect the surface quality and uniformity during and following processing. The optional substrate 212, the support layer, may be either some form of inflexible material such as glass, sapphire or silicon, or a flexible web-like material such as Mylar® or Kapton®. It will be apparent that if no substrate is provided, a portion of the lower cladding 202 itself may act as the support material.

The lower cladding 202 is preferably a crosslinked polymer, for example, an (acryloxypropyl)methylsiloxane-dimethylsiloxane copolymer (available from Gelest, Inc. of Tullytown, Pa. as product code UMS-992), or may alternatively comprise an inorganic or non-crosslinked organic material, for example silica glass, polymer, semiconductor, sol-gel, aero-gel, liquid crystal, self assembled monolayer or ceramic. A crosslinked polymer is defined as a network formed by a multifunctional monomer/polymer. In a loosely-crosslinked material, local freedom of motion associated with the small-scale motion of chain segments is retained, but large-scale movement (flow) is prevented by the restraint of a diffuse network structure. The crosslinked network extending throughout the final article is stable to heat and cannot be made to flow or melt under conditions that would cause linear (not crosslinked) polymers to flow or melt.

The lower cladding 202 may be deposited on the substrate by one of the many available methods known in the art (dependent on the material used), such as for example spin, meniscus, extrusion, spray, dip, slot-die, or flash evaporation coating for polymer materials, vacuum deposition (e.g. evaporation, sputtering, chemical vapor deposition, CVD, or plasma enhanced CVD) for hard oxide or nitride materials such as $SiO_2$ or $SiN_x$. The top surface of the resulting lower cladding layer (the surface furthest from the substrate) should be optically smooth and defect free so as to result in low scattering of the optical mode at the core-cladding interface and subsequently lead to a low optical waveguide propagation loss in the integrated optical circuit. In addition, the cladding layer material itself should inherently exhibit low absorption and scattering at the wavelength(s) to be guided in the optical structure.

It is preferable that, once deposited, this lower cladding layer be stable, that is of a consistency such that it does not flow over or into the substrate, and that it is both structurally and chemically able to receive the core layer above it without being adversely structurally or chemically affected, i.e., rendered incapable of acting as a waveguide cladding layer, or preventing an overlying layer from operating in its desired photodefinable manner. For lower cladding materials that do not inherently exhibit these properties in the as-deposited state, it is preferable that they be at least partially cured to achieve these properties. Partial curing means treating or processing such that further reaction during or following processing may be allowed if appropriately activated and desired. The at least partial curing may be accomplished by incorporating a plurality of photosensitive molecules of a first type, the photosensitive molecules comprising photosensitive monomers, charge transfer agents, photoinitiators or other such molecules that can be activated at a selected wavelength, $\lambda_{LC}$, or range of wavelengths, in the lower cladding material. For example, this first type of photosensitive molecule may be activated at a long wavelength such as that of visible light with a wavelength greater than 430 nm. Once deposited, e.g., by sputtering, the lower cladding polymer layer may then be exposed to this visible light, by for example a conventional lamp/filter combination, causing sufficient linking of the molecules such that the material is prevented from flowing or swelling. The inclusion of such a first type of photosensitive molecule enables the lower cladding layer, once deposited, to be at least partially cured, that is to substantially retain its thickness and uniformity despite subsequent processing.

An optical core layer 204, preferably a polymer layer as described below, is next applied over the lower cladding layer 202 to ultimately provide an optical waveguiding structure. At this stage, the refractive index difference between the as-deposited core and the upper and lower cladding layers, combined with the thickness of the core layer, does not have to be sufficient to provide confinement for at least one propagating mode of the structure, but the material selection does enable such confinement once the subsequent photodefinition process has been completed. Hence, the portion of the core layer that has been subsequently photodefined has a refractive index that is different, that is either greater or less, than either of the cladding layers. However, the present embodiment uses different starting (as-deposited) indices in the vertical direction for the different layers of the optical structure, and employs the photodefinition diffusion process to create lateral waveguide mode confinement. In addition, the thickness and the refractive index difference between the core and cladding layers should preferably be sufficient to ensure that the evanescent field of the optical mode in the cladding layer has decayed away to substantially zero before it reaches the outermost boundary of the cladding, in order to minimize propagation or absorption losses and the effect of the environment. However, for situations in which it is desirable that the waveguide mode interact with the cladding surface or features adjacent thereto, for example electrodes, it may not be necessary for the evanescent mode to decay to such a value. Equations for determining appropriate optical thickness are well known in the art, and can be found, for example, in Nishihara et al., "Optical Integrated Circuits", McGraw Hill, 1989, incorporated herein by reference in its entirety.

The deposition process for the core layer is again dependent on the material choice, as for the lower cladding layer. Suitable choices for the core layer are polymer materials such as Norland Optical Adhesive 68, PMMA, or a suitably selected crosslinkable polymer. The selected material should be able to provide a different refractive index (i.e. higher or lower) than both the cladding layers (at least once photo-definition has been completed) and possess sufficient optical transparency (low absorption and scattering losses) for the desired wavelength(s) to be propagated through the optical structure, with acceptably low losses (acceptable loss is determined by the exact device design and function). In addition, this core layer should have a low surface roughness to prevent excess propagation loss due to scattering at the interlayer interfaces.

As for the lower cladding 202, a limited or partial cure of the core layer 204 may be advantageous depending upon the material utilized. Such limited or partial curing may be preferred in the case where the core layer is to be photodefined. In this instance, the partial curing of the polymer prior to the photodefinition step enables sufficient crosslinking to prevent the material from flowing, swelling, or chemically interacting with the other layers, hence providing for a robust structure capable of being rolled up (provided that the substrate is not rigid) and stored in a pre-patterned state. However, the crosslinking is not sufficient to entirely prevent subsequent diffusion or further crosslinking from occurring after appropriate processing. The partial cure may be performed at either the same wavelength $\lambda_{LC}$ as the lower cladding 202, or a different wavelength $\lambda_C$. It will be apparent that if partial curing of the core layer 204 is to occur at the same wavelength as the lower cladding 202, the same first type of photosensitive molecules may be incorporated into the core layer 204 on deposition.

In addition to this first type of photosensitive molecule, the core layer 204 in this embodiment is preferred to comprise a second type of photosensitive molecule. This second type of photosensitive molecule may comprise a photosensitive monomer, charge transfer agent, photoinitiator or other such molecules, that is activated at a second wavelength distinct from the first wavelength, for example a UV wavelength. It is this second type of photosensitive molecule that will later be utilized for creation of the optical waveguide. In general, the greater the concentration of the second type of photosensitive molecule in the core layer material, the greater the refractive index change achievable upon later photodefinition up to the limit imposed by the number of total bonds which can form in the polymer. Preferably the second type of photosensitive molecule concentration should be in the range of 0.1% to 20% by volume of the core layer material, but it may be as high as 80%. It is important that a response, e.g., the absorption wavelength, of the second type of photosensitive molecule be either above or below some threshold set by the properties of the first type of photosensitive molecule. In this manner, it can be arranged such that substantially only one of the first or second types of photosensitive molecules will respond at a given wavelength.

Figure 3:
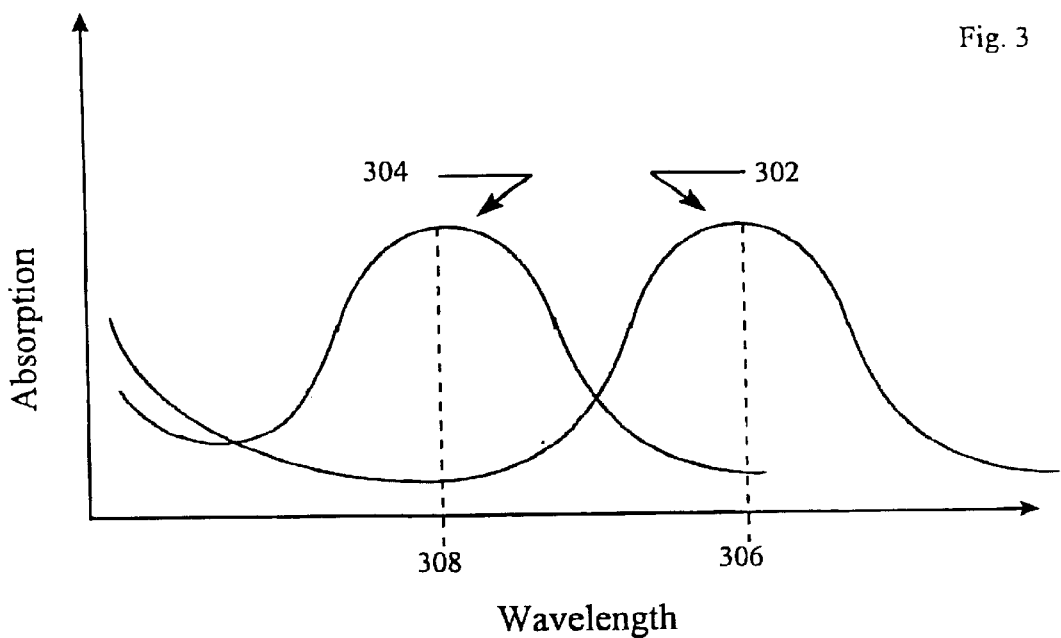
FIG. 3 illustrates the optical response characteristics of two photoinitiators.

FIG. 3 shows the spectral responses of two hypothetical types of photosensitive molecules, specifically for incorporation in the embodiment of FIGS. 2a–2e, a first type of photosensitive molecule 302 and a second type of photosensitive molecule 304. Their different response characteristics can be exploited to effect separate activation by exposing them to different wavelengths of light. The first type of photosensitive molecule 302, with its strong response at a longer wavelength 306, is activated first using a lamp/filter combination with a sharp wavelength cutoff below some lower threshold set by the properties of second type of photosensitive molecule 304. This first wavelength exposure does not substantially affect or activate this second type of photosensitive molecule 304, although there may be a weak absorption by the second type of photosensitive molecule, possibly inducing a small activation of that species. After the first activation reaction due to the first type of photosensitive molecules has proceeded, either partially or to completion, the second type of photosensitive molecule 304 can be activated to induce curing at some later time using a second exposure at a shorter wavelength 308. Note that because of the short wavelength absorption tail associated with the first type of photosensitive molecule 302 (a general characteristic of a broad variety of polymers), it is preferable that the sequence of exposures is not reversed.

It should be noted at this stage that the amount of the second type of photosensitive molecule present in the photodefinable layer influences the refractive index change and thus optical mode width achievable within the photodefined waveguide. The greater the amount of the second type of photosensitive molecule used in the core layer, in general, the higher the refractive index change caused by photodefinition and the narrower a mode shape that may be achieved, up to some limit set by the maximum differential refractive index that can be created in the material using the preferential curing invoked by the patterned exposure. The degree of cure (that is the extent of reaction, defined by the number of bonds formed as a fraction of the total number of bonds capable of forming) of the core layer 204 polymer is positively proportional to the curing energy applied, or alternatively to the amount of the photosensitive molecule species that is activated by exposure to radiation. The partial degree of cure which is applied to the core layer after deposition to make it chemically and mechanically stable and robust, is an important factor in achieving a narrow waveguide mode width and high quality channel waveguides by the photodefinition process described herein. The narrowest most highly confining waveguide is generally achieved by applying the lowest degree of partial cure which is still compatible with the chemical and mechanical stability required by the core layer film. A final locking step (discussed below) is then preferably administered to ensure chemical, thermal and physical stable devices result.

Following the core layer deposition and pre-cure, an upper cladding 210, which may be comprised, for example, of another (acryloxypropyl)methylsiloxane-dimethylsiloxane copolymer (available from Gelest, Inc. as product code UMS-182), is provided to isolate the optical mode from actuators or the effects of the environment. The combination of the refractive index difference between the core and the upper cladding (at least after photodefinition has been completed) and the upper cladding thickness should be sufficient to cause the evanescent field of the optical mode to have decayed to substantially zero before it reaches the outer surface of the cladding to prevent absorption losses from occurring in overlying areas. Alternatively, if it is desired that the mode interact with features or materials (e.g. a chemical species in a sensor) outside the optical multilayer stack, the top cladding thickness and refractive index may be chosen such that the evanescent field of the mode has a predetermined strength at the upper cladding top surface to provide a desired mode interaction. Other suitable choices for the upper cladding layer 210 material include crosslinkable polymers, inorganic or non-crosslinked organic material, for example silica glass, polymer, sol-gel, aero-gel, liquid crystal or self assembled monolayer. The chemistry and the method of deposition utilized for this upper cladding layer should be such that its deposition does not deform or otherwise damage the core layer on which it lies, or render it incapable of further photodefinition if desired.

Once again, partial curing of this layer may be desirable, either at the same wavelength $\lambda_{LC}$ as the lower cladding, the core layer $\lambda_C$, or a different wavelength $\lambda_{UC}$. It will be apparent that if partial curing of the upper cladding layer is to occur at the same wavelength as the lower cladding, the same first type of photosensitive molecule may be incorporated into the upper cladding layer on deposition. In addition, it is important that the partial cure of the upper cladding layer should not significantly increase the level of cure of the core layer, at least not to such an extent as to interfere with the later photodefinition process.

In this manner, all three materials of the lower cladding layer, core layer and upper cladding layer may be at least partially cured, creating a temporary controllable chemistry in a predetermined manner. The temporary controllable chemistry means that the chemical and physical nature of the three materials is sufficiently stable that they can form the multilayer structure described, but that they can be further processed if so desired. The materials are thus initially selected such that when at least partially cured, they are able to be substantially stable both structurally and chemically. It should be noted that fabrication of the multilayer stack has been discussed as possibly requiring at least partial curing of the three layers. Hence it will be apparent that fabrication of the stack may allow for the upper and lower cladding layers to be fully cured, but the core layer, and any other layer that is desired or designed to be photodefined, is not fully cured prior to waveguide photodefinition.

We believe that the resulting mode profile diameter of an optical waveguide formed utilizing a photodefinition process according to the embodiment described herein decreases as the energy that is applied to the partial cure decreases. Note, however, that the mode profile diameter is also dependent upon other parameters, for example the core layer thickness, the cladding refractive index etc.

It should be noted that although the description above discusses a three layer optical stack, the substrate/lower cladding, core and upper cladding layers, many more layers may be added to the structure. In particular, many more layers may be placed either above or below the core layer, and patterned with UV light as described herein. Except where the context requires otherwise, the terms "above" and "below" are intended to be interpreted transitively. That is, one layer is considered to be "above" or "below" a second layer, even if there is an intervening layer between the first and second layers. In addition, in the embodiment described, the refractive indices of the upper cladding, core and lower cladding layers are portrayed as having their own individual refractive indices, however it is quite possible that the upper and lower cladding layers have the same refractive index, and it is possible that the core layer, prior to the patterning step, have the same refractive index as either or both of the cladding layers. In this case the core layer would have a photosensitive molecule that will enable the photodefinition process to occur. It is therefore possible that all three layers, the lower cladding, upper cladding and core comprise the same material, and have substantially the same refractive index prior to photodefinition, the core layer being distinct in that it also comprises at least first photosensitive molecules.

The method set forth above is presented as a non-limiting example of a technique for fabricating an optical multilayer stack. Other fabrication methods will be apparent to those skilled in the art. For example, an optical multilayer stack may be created by the process of lamination. In this process, the at least partially cured lower cladding, core and upper cladding layers are laminated by placing them in contact with one another and controllably applying pressure uniformly such that the air between the layers is substantially removed. At this stage, after lamination, no photodefinition to create the waveguide has yet occurred, and the lamination process has played no part in the diffusion process.

Patterning with Ultraviolet Light, Photodefining

Once the optical multilayer structure has been constructed, the optical waveguide, which may take any desired dimensional shape in the plane of the photodefined layer, for example a planar or channel waveguide, is created by the process of photodefinition. The waveguide pattern desired may be defined by a mask 206, which has at least a patterned area through which actinic or other radiation 205 can pass. The mask 206 can be, for example, a conventional layer of photoresist, opaque at the wavelength of the second cure, which has been exposed and etched to the desired pattern. Once the mask has been placed or fabricated (e.g., in a lithographically patterned metal or resist layer) on the uppermost surface of the upper cladding layer 210, a UV light source or other suitable source is aimed to direct radiation towards the masked surface. In embodiments where exposure to radiation (preferential cure) leads to an increased refractive index region, optical waveguides are created in the areas through which actinic radiation can pass, and not in areas void of illumination (i.e., those regions covered by the opaque portions of the mask 206).

Alternatively, a projection or proximity exposure system can be utilized whereby the mask never contacts the surface of the polymer, but the pattern is imaged either using lenses or collimated light into the polymer to have substantially the same effect as the contact process. Equally, a direct write process could be used where a focused beam of radiation, for instance a UV laser (excimer) or electron beam, is scanned across the surface of the polymer layers to define the irradiated pattern, possibly also utilizing intensity modulation to control the exact position of the features in the waveguide network.

In this photodefinition step, uniformity of the radiation beam cross-section as it descends upon the uppermost surface of the upper cladding, through the mask, is desirable. Such uniformity aids in the uniformity of the refractive index variation achieved throughout the volume, and the uniformity of the optical waveguide network formed by the photodefinition process.

The radiation 205 passes through the open areas of the waveguide mask 206, through the upper cladding layer 210 and into the core layer (or photodefinable layer) 204. In this selected volume of the core layer, the volume exposed to the radiation 205, the second type of photosensitive molecule is "activated" by the actinic radiation, and an optical waveguide is formed.

The waveguide network can easily be defined to any desired two dimensional shape in the plane of the photodefined layer, by appropriately fabricating the mask 206, waveguide structures including curves, X- and Y-branches, and parallel couplers can be created. The waveguide created may support either multiple transverse optical modes or a single transverse mode, depending on the strength of the optical confinement and the dimension of the guide. In general, an optical mode is distinguished by its electromagnetic field geometry in two dimensions, by its polarization state, and by its wavelength. If the index of refraction change experienced by the optical mode is small enough (e.g,. $\Delta n = 0.003$) and the dimensions of the guide are narrow enough (e.g. 5.0 $\mu$m), the waveguide will only contain a single transverse mode (the lowest order mode) over a range of wavelengths. For larger refractive index differences and/or larger waveguide physical dimensions, the number of optical modes increases. Preferably the waveguide is designed to support only a single, lowest order, mode, eliminating the complexities associated with higher order modes. Higher order modes have different propagation constants than lower order modes, and higher scattering loss, which can be problematic in some applications. In other applications where higher power is desired, higher order modes might be more beneficial.

It will be apparent that although the description above discusses an embodiment in which the core layer includes the second type of photosensitive molecules and thus provides the refractive index change to create the waveguide, embodiments in which the cladding layer includes the second type of photosensitive molecules are also possible. In these embodiments a structure known in the art as a "strip-loaded" waveguide may be created. On exposure of the selected volume of the chosen cladding layer, (for example the upper or lower cladding layer) activation of the second type of photosensitive molecule and further polymerization occurs, increasing its refractive index, which may also be accompanied by diffusion of second type of photosensitive molecule and monomer into the selected volume of the cladding layer. The rib of increased index located adjacent to the planar core layer induces a channel (or a three dimensional) optical waveguide, (see, for example, the aforementioned Nishihara et al. reference). The refractive index change in the selected volume of the cladding (together with any associated refractive index decrease in the adjacent cladding areas) must be taken into account in the design of the waveguide to ensure single mode (or multiple if desirable) propagation. Note that the rib of increased index does not have to be localized adjacent the core, but may extend through the entire thickness of the cladding layer.

Alternatively, the photodefinable layer does not have to fulfill the function of either the core or upper cladding layers. By placing a thin photodefinable layer adjacent the core layer (above or below), the rib of increased refractive index described above may be created by photodefinition. However, the optical mode is not confined within the photodefined layer itself, but rather within the adjacent core layer, the rib providing lateral confinement and guiding. Note also that the rib does not provide the cladding layer functionality as it is not sufficiently thick to isolate the optical mode and is therefore itself placed adjacent the cladding layer.

In order to photodefine waveguides in a multilayer polymer structure, it is preferable to photoinduce index changes in one layer to the relative exclusion of changes in the other layers which, in general, lie above and below the one of interest. However, as long as the refractive index changes in the various layers are controllable and predictable it is possible to create waveguide structures while allowing refractive index changes to occur in more than one layer as a result of the same exposure.

The process described above, preferably utilizing a polymer comprising at least two types of photosensitive molecules can be utilized to create a high quality optical waveguide by creating the channel waveguide directly in the core layer, through the upper cladding layer. In particular, it utilizes two types of photosensitive molecules with different spectral responses. The first type of photosensitive molecule is selectively activated to at least provide a partial cure level to structurally fix the multilayer stack so it can be safely handled, stored and distributed. The second type of photosensitive molecule is later used to photodefine the layer of interest.

It will be apparent that this invention is not limited to the utilization of only two types of photosensitive molecules. A third type of photosensitive molecule, for example, may be included, enabling even further photodefinition to be possible in a subsequent step. The third type of photosensitive molecule would react to a third wavelength of light different from that of the first and/or second types of photosensitive molecules. Similarly, fourth, fifth, etc. types of photosensitive molecules may be incorporated into the design and fabrication process.

In an alternative embodiment, there is no requirement for the core (or photodefinable) layer to comprise two different types of photosensitive molecule. In such an embodiment partial cure of the lower cladding layer may be induced thermally, or by activation of a first type of photosensitive molecules. The core layer is then deposited, the core layer comprising a second type of photosensitive molecules. In some embodiments the first and second photosensitive molecules may be of the same type. Partial cure of the core layer may be achieved by activating some of the second type of photosensitive molecules, or by thermal or electron beam curing methods. The deposition process and partial curing process of the upper cladding layer must be chosen such that they do not substantially or adversely affect the level of cure in the core (photodefinable) layer. That is, if a photoexposure is used to activate a type of photosensitive molecule in the upper cladding layer, that exposure should not affect the level of cure in the core layer such that photodefinition cannot be achieved with a subsequent patterned exposure of appropriate wavelength to activate the type of photosensitive molecules in the core layer. Subsequent photodefinition of the core layer is achieved by activating the remaining second type of photosensitive molecules, which may be achieved by exposure to the same wavelength that may have been used in the partial cure process.

It will also be apparent that this invention is not limited to a process that requires photodefinition through only the upper cladding layer as described above. It is possible to utilize this process by photodefining through any layer, or some number of layers, for example the lower cladding layer or the substrate itself.

It should be noted that wherever the methods described herein call for photosensitive molecules of a particular type, it will be appreciated that the molecules of that type can be accompanied by additional molecules of a different type, which are activated in the same step as the molecules of the particular type. The additional type can be chosen to be activated by exposure to the same radiation as the particular type, or alternatively, can be chosen to be activated by exposure to a form or wavelength of radiation that is different from that which activates the molecules of the particular type. If the additional type is activated by exposure to a form or wavelength of radiation that is different from that which activates the molecules of the particular type, then different embodiments can provide the two types of radiation either simultaneously or sequentially.

Enhancing the Diffusion/Crosslinking Process

If considered necessary, an optional bake process may be applied to the multilayer stack to enhance the diffusion or the crosslinking process. This step is performed between the patterned photodefinition exposure and the final "lock up" exposure provided to secure the waveguide pattern in the polymer structure. The range of temperatures and the time for which the heat should be applied will vary depending upon the chemical nature of the multilayer stack. It is desirable that the heat applied is above room temperature such that molecules are able to move, yet not so high that these same molecules evaporate, sublime or otherwise disassociate from the multilayer stack, for example, in the range of 25 to 100° C. The time for which the heat is applied preferably is long enough to attain equilibrium of diffusion or crosslinking in the desired region. For the multilayer stack described hereinbefore, a bake process carried out at a temperature in the range of 60 to 85° C., preferably 75° C., for a time period in the range of 15 minutes to 1 hour, preferably 30 minutes, is effective in achieving photodefined waveguide fabrication.

Locking the Final Structure Permanently

It should be noted that prior methodology leaves open the possibility that unreacted material may remain following processing, which may then further react or degrade during use or storage in a manner (i.e., a slow change in refractive index) that decreases the device performance. For example, U.S. Pat. No. 4,712,854 (Mikami et al.), incorporated by reference herein, describes a process in which the refractive index variation of a photodefined material is controlled by the progress of the photopolymerization of the material. Prior art technology requires or recommends that the wavelength of the light to be guided be preferentially outside the wavelength range of photosensitivity, which encompasses the wavelength of the light to which the sample was exposed (for example) in order to avoid further reaction or change in the cross-sectional variation of the index of refraction within the guide.

The embodiment of FIGS. 2a–2e, provides a final locking step to be administered to ensure a chemically, thermally and physically stable waveguide, both at this stage and following any subsequent processing that might be performed. The entire structure is exposed to radiation wavelength(s) 214, such that any of the types of photosensitive molecules that have not been activated are now utilized, thus completing the curing of any layers which were previously only provided with a partial level of cure as described above. Hence, in the example given, if all the three layers (the lower and upper claddings, and the core layer) included a first type of photosensitive molecule which responded to wavelength $\lambda_{LC}$, exposure to at least this wavelength would be required so that the structure would be stabilized. In addition, exposure to $\lambda_C$ and $\lambda_{UC}$ to activate any or all of the second type of photosensitive molecules is desirable to prevent further refractive index changes. In the above-described embodiment, it is preferable that the structure is uniformly exposed at the activation wavelengths of all the types of photosensitive molecules incorporated into the three layer structure such that substantially all the types of photo sensitive molecules in the polymer multilayer structure are activated. In this manner, further exposure to actinic radiation in the course of processing will not induce any further curing of the polymer layer and will thus not (in principle) affect the patterned index structures created by the previous photodefinition process. Exposure for a time period in the range of 5 to 30 minutes, with the intensity ranging from 5 to 50 mW/cm$^2$, is considered necessary to lock the chemical structure without chemically degrading the material. Exposure for 10 minutes at 20 mW/cm$^2$ is preferable for the materials disclosed above. The range of intensities and the time for which the radiation should be applied will vary depending upon the chemical nature of the multilayer stack. It is desirable that the radiation is applied at an intensity to enable activation of the photosensitive molecules, but not at an intensity at which destruction of the individual layers occurs. The time for which the radiation is applied should preferably be long enough to achieve full activation of all types of photosensitive molecule and "complete" cure and may range from approximately a minute to 5 hours.

In terms of the final, lock up exposure, the term "complete" cure represents the activation of substantially all the photosensitive molecules present in the polymer materials, and thus represents a substantially unchanging state of cure or bonding, which will not vary significantly over time, as the result of further processing, or as a result of exposure to guided optical energy of any wavelength.

It should be noted that it is possible to sensitize the polymer to control the conditions that influence activation of the photosensitive molecules using commercial sensitizers such as peroxides like benzoyl peroxide. These molecules may be added during processing, or in appropriate cases, following deposition and before photodefinition.

Figure 4:
FIGS. 4(a) and 4(b) (collectively FIG. 4) experimentally show the observed mode profile for waveguides created via reactive ion etching and via the UV photodefinition process of the current invention, respectively.

FIG. 4 provides a comparative illustration of mode profiles in two different waveguides, the first waveguide being fabricated using a known reactive ion etching (RIE) technique, and the second being fabricated by employing the photodefinition process set forth above. It is found that the mode width for an optimized photodefined waveguide profile (FIG. 4(b)) is only about 1 $\mu$m wider than for the RIE waveguide profile (FIG. 4(a)). It is believed that the waveguide created by the RIE process produces a step-like index profile, and that the waveguide created by the UV photodefinition process produces a graded (e.g. gaussian) index profile.

When light at 980 nm is focused into the guides formed using the process described above, single transverse mode optical waveguide mode patterns are observed in the transmitted light. The materials and thicknesses used in one example are as follows: a Corning 1734 glass substrate; a Gelest UMS-992 polyacrylate lower cladding, layer thickness 5 $\mu$m; a Norland Optical Adhesive 68 core, layer thickness 1.2 $\mu$m; and a Gelest UMS-182 polyacrylate upper cladding, layer thickness 1.4 $\mu$m; with Darocur 1173 (Ciba Giegy) and Irgacure 369 (Ciba Giegy) as the first and second photosensitive molecules respectively. As fully processed, the materials used in experimental construction of the three layers provide indices of refraction of 1.488, 1.522, and 1.422, respectively. The optical throughput of a 4 cm long waveguide is up to 25% and the mode diameter is 10.5 microns in the plane of the core layer. Thus the present invention is capable of providing photodefined optical waveguides suitable for application in novel integrated optic based flat panel displays, for example, the type of display described in U.S. Pat. No. 5,544,268 to Bischel et al., incorporated by reference herein.

It should be recognized that the foregoing description concerning the number and ordering of process operations, and series of operations, sets forth one exemplary method for constructing one embodiment of the invention. Numerous alternatives to the aforementioned process sequence, as well as partial performance of certain operations or series interlaced with partial performance of other operations or series, exist and are within the contemplated scope of the invention.

Discussion of Possible Mechanisms for Change in Index

It is well known that photodefined waveguide formation results from an induced change in refractive index. Prior art for the photodefinition of waveguides assumes that small molecule diffusion is required for the definition process to occur. Diffusion of some small molecules into the selected volume (the region undergoing photodefinition) aids in increasing the refractive index, however it is believed that there are other mechanisms that may play a part in the definition process.

It is known to those skilled in the art that one mechanism for changing the index of refraction of a monomer/polymer is by reacting it, taking advantage of the fact that the polymer has a different index of refraction than the monomer. The photodefinition process encourages reactions to occur, including those which induce polymerization of the monomer within the selected volume. In general, a monomer and a corresponding polymer have different indices of refraction; for example the indices of methyl methacrylate ($n_D^{20}$=1.4140) and styrene ($n_D^{20}$=1.5470) differ significantly from poly(methyl methacrylate) ($n_D^{20}$=1.4920) and polystyrene ($n_D^{20}$=1.5916) respectively. In general, forming a network or crosslinked polymer increases the refractive index even more than forming a linear polymer due to the fact that more bonds are formed.

In addition to the monomer polymerization, other photosensitive molecules, for example photoinitiators, sensitizers, etc., also may be activated and form crosslinked bonds within the polymer network. The amount of a type of photosensitive molecule present is partially responsible for controlling the number of crosslinked bonds formed, enabling the monomer to crosslink with polymer (for example), the number of reactions that occur may therefore be controlled by, among other variables, changing the photosensitive molecule concentration. The photosensitive molecule concentration thus affects the final density and index of the reacted material, by affecting the number of crosslink bonds formed, up to the maximum number that can be supported by the polymer network. A greater number of crosslink bonds per unit volume tends to pull the polymer chains more closely together, compacting the structure and increasing the material density and thus increasing the index of refraction. It should be noted that the crosslink density may also be changed thermally, radiatively, or by other means, not just via photodefinition. Incomplete reaction (residual monomer or unactivated photosensitive molecules) or lowered crosslink density decreases the amount of index change achievable. However it is also well known that the index change achieved by this mechanism may be relatively small, and therefore this may not be the only mechanism at work in the invention described herein.

A second possible mechanism for changing the refractive index in a polymer is by increasing the material density of the system in question, without necessarily increasing the number of crosslink bonds per unit volume. In the material system of the multilayered stack described, the polymerization reactions described above cause a depletion of both the second type of photosensitive molecule and/or the unreacted monomer. These depletions produce gradients in concentration and chemical potential which in turn induce the second type of photosensitive molecule and/or monomer in the adjacent unaffected (unexposed) region(s) to diffuse into the selected volume. This type of diffusion mechanism has been described in the research literature (Colburn et al., Applied Optics, 10, 1636 (1971) and Wopshall et al., JOSA, 61, 649 (1971), both incorporated by reference herein). As the monomer diffuses into the selected volume, the density of that volume increases, increasing the refractive index of the selected volume and potentially creating an optical waveguide, (provided that for the material of choice the refractive index increases with density).

In the embodiment described earlier, in which the core layer of the optical waveguide included a second type of photosensitive molecules, and the core layer had a refractive index that was greater than that of the surrounding cladding layers, the following condition should be noted. The diffusion of monomer and the second type of photosensitive molecules from the adjacent planar core layer to the selected volume (to eliminate the concentration gradients and chemical potential induced by the activation of the second type of photosensitive molecules and the subsequent polymerization of the monomer) may result in a slight decrease in refractive index of the region directly adjacent the waveguide compared to that which would be expected from a uniformly cured planar layer where no volume was selected for preferential activation of the second type of photosensitive molecule.

A third possible mechanism for changing the refractive index involves the diffusion of either a second type of photosensitive molecules, or any reactive or unreactive small molecules that differ in refractive index from the final polymer, into the selected volume. The unreacted small molecules may be encapsulated, stable molecules, forming either an interpenetrating network or a semi-interpenetrating network. In the case of the second type of photosensitive molecules, this mechanism may increase the refractive index of the selected volume as the post-activation remnants of the second type of photosensitive molecules may increase the polarizability of the volume and hence increase the refractive index.

The Effect of Photodefinition on Tg

The number of polymer crosslink bonds formed strongly affects the glass transition temperature, Tg. The glass transition temperature (Tg) is a range of temperatures over which significant local motion of the polymer backbone occurs. The Tg is usually defined as cooperative motion of about 10 backbone units, or a viscosity of $10^{14}$ poise, or a second order phase transition in heat capacity. The temperature at which a measured change in slope occurs in the rate-of-change-of-volume with temperature curve, is considered the glass transition temperature (Tg), or softening point. For a detailed description see G. B. McKenna, chapter 10, Comprehensive Polymer Science, Volume 2, Edited by C. Booth and C. Price, Pergamon Press, Oxford (1989), incorporated by reference herein.

The glass transition temperature (Tg) in any region of a polymer is a function of the density ($\rho$) in that region. In general, as the density increases, the index of refraction also increases. Thus the change in density thought to be associated with the photodefinition process, in addition to causing a refractive index change in a photodefined waveguide, should also cause a change in the glass transition temperature. The glass transition temperature may therefore be considered an alternative parameter for qualitatively evaluating the optical properties of a polymer system.

For example, in an embodiment of the current invention, measurements taken using the TMA feature of a TA Instruments Atomic Force Microscope-Thermo-Mechanical Analyzer (AFM-TMA) indicate that the glass transition temperature of the crosslinked polymer inside the photodefined waveguide region is about 20° C. higher than that outside the photodefined waveguide region. This change in Tg indicates a significantly higher number of crosslinked bonds in the waveguide region.

It may be preferable for the photodefinable layer to comprise a lower Tg, lightly crosslinked material, where a given absolute change in the amount of crosslink bonds may lead to a higher percentage change in material properties than in a higher Tg, highly crosslinked material, and thus a more effective photodefinition process.

It should be noted that the index of refraction of a network polymer may be a function of processing, i.e. dependent on the method of polymerization. This is partly related to the crosslink density achieved (in general the higher the crosslink density, the higher the index of refraction) or, in systems where the monomer or a type of photosensitive molecule has multiple, similarly reactive sites, the type of crosslink bonds formed. Thus, polymer formed using free radical polymerization as described herein, will potentially have different indices than those formed using electronic beam cures, anionic or cationic polymerizations, etc. This is not important as long as the material indices of the different layers after curing are correctly chosen to form the desired waveguide structure after photodefinition.

Bumps

In the prior art, photodefined waveguides have generally been accompanied by swelling or bumps on the surface of the photodefined (core) layer. These are believed (as discussed in Ashley et al., IEEE Photonics Tech. Lett., 4(9) 1026 (1992), incorporated by reference herein) to result from indiffusion of monomer into the selected volume locations where activation of the photosensitive molecules causes polymerization to occur. The indiffusion of the monomer during the curing or crosslinking process causes the selected volume to swell under certain but not all conditions. The presence of the bump may result in enhanced waveguiding by confining the beam more tightly to the waveguide channel. However, difficulties associated with the planarization of overlying layers may more than offset this advantage, and consequently photodefinition has not been as widely utilized to date as one might otherwise imagine. One of the major attributes of the approach described herein (utilizing two types of photosensitive molecules) is that it can effectively minimize or substantially eliminate the diffusion-induced bump. By partially curing the polymer layer to be photodefined prior to the patterning step, the crosslinking process may occur to an extent sufficient to prevent the material from swelling but not enough to necessarily prevent diffusion from occurring. Diffusion of monomer and/or the second type of photosensitive molecules into the crosslinked region may still occur efficiently, with additional heat or other assistance if necessary; the resulting photodefined waveguide layer may be shown to be substantially planar with no bump if desired. Thus the refractive index of the selected volume may be increased without the polymer structure being allowed to stretch or swell to form a bump. If appropriate ratios of pre-cure and patterning exposures are used, it may be expected that the degree of initial crosslinking may be controlled, and that the extent of swelling on photodefinition also controlled so as to yield bumps if required i.e. a lower level of pre-cure may result in more significant bumps after photodefinition.

The at least partially crosslinked structure of the pre-photodefinable stack also may largely inhibit material swelling (due to diffusion) during the photodefinition cure process, resulting in a substantially planar surface to the photodefined waveguide system if desired. Additionally, the photodefinition waveguide creation process may be achieved without the use of extra chemicals or solvents, and may be performed as rapidly as the activation energy (exposure) dose is applied to the stack.

An attractive feature of the embodiments described herein is that the optical multilayer polymeric stack is an at least partially crosslinked structure before the waveguide photodefinition step. This results in the stack being substantially stable with respect to environmental, chemical, physical, and processing conditions, despite the fact that the material is in the form of a thin film a few microns thick. Thus, considerable delay may be introduced or intermediate processing may be performed between the deposition/construction of the complete optical waveguide multilayer stack and the photodefinition patterning of the waveguides. For example, if the substrate is flexible, the stock can be processed to just prior to the photodefinition step, and then rolled onto a reel for short- or long-term storage before being brought out again for further processing.

Rapid Prototyping

Another application of the waveguide photodefinition process described herein is in the field of rapid prototyping of optical waveguide devices. In this application, a sheet of pre-deposited, partially cured multilayer optical stack may be exposed either using mask type photolithography, or using a direct write laser (e.g. UV excimer laser, solid state UV laser or Argon laser) or electron beam system to define a waveguide network in the photodefinable layer of the structure. A particular advantage of the scanned direct write laser exposure system is that there is no requirement to fabricate time consuming and costly photolithographic masks to produce a prototype device. Optical design computer aided design files can simply be written directly into the photodefinable layer using the scanned laser or electron beam. In addition, the pre-deposited optical multilayer stack can be prepared or purchased significantly in advance of the waveguide fabrication date, enabling stockpiling of "raw" material. The combination of these advantages may lead to significantly reduced device design, testing and optimization time cycles compared to the current state of the art, where a multilayer stack must be built and a new exposure mask designed and fabricated, for each iteration of device design.

Photodefined Grating Devices

Other applications for photodefined optical polymer active and passive devices fabricated as described herein include Array Waveguide Grating (AWG) devices and Bragg gratings, both used in the telecommunications field for dense wavelength division multiplexing (DWDM) components and other applications. AWG devices often have multiple (16 or more) channels, and have an inherent size advantage in telecommunications applications because they are integrated devices. By separating the input signal into N channel waveguides, each designed with a different path length, and recombining them in an N×N coupler, the wavelength multiplexed data channels become spatially separated through interference and diffraction effects. Bragg gratings selectively filter wavelengths, where, for example, all wavelengths pass through the device except the targeted wavelength, which is reflected.

Polymer thermo-optic grating devices may be used as optical filters, add/drop multiplexers, or more generally as thermo-optically tunable Bragg gratings. Desirable properties include long-term stability of index of refraction, a large material thermo-optic coefficient, linearity of response as a function of temperature, and lack of birefringence. All of these properties are obtained with optical polymer waveguide materials as described herein.

Figure 7:
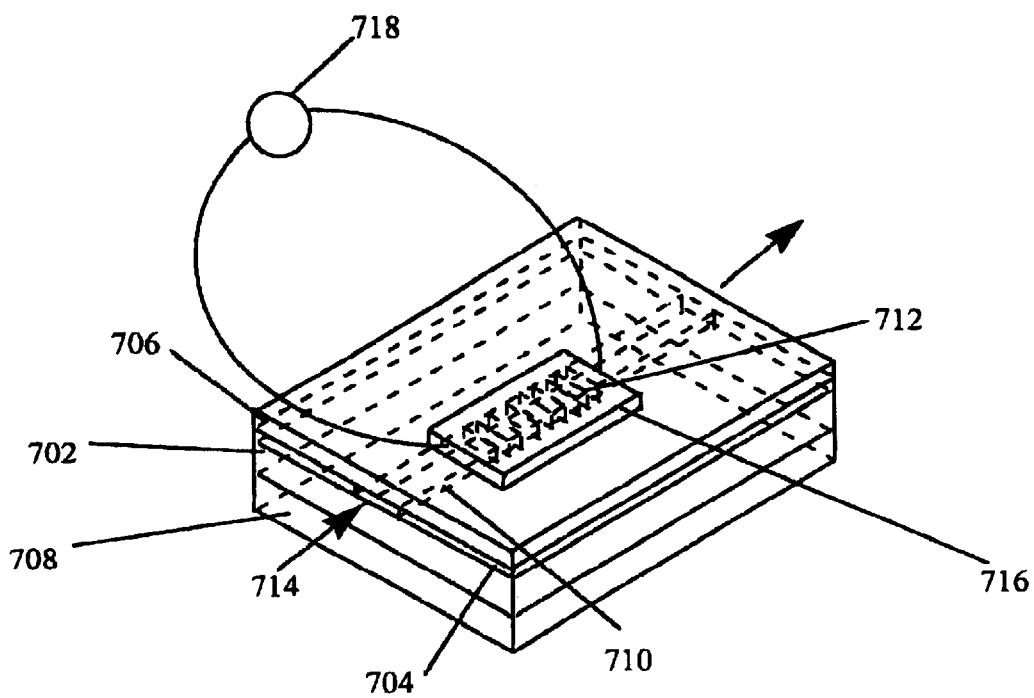
FIG. 7 is a perspective view of a thermo-optic grating device fabricated according to the invention.

In the spirit of this invention, a Bragg grating illustrated in FIG. 7 may be formed in a polymer multilayer stack consisting of a lower cladding layer 702, core layer 704, and upper cladding layer 706, on a substrate 708. The core layer may be defined after the multi-stack is deposited, to contain a waveguide (as described earlier) where the optical mode in the waveguide 710 now overlaps a region containing a grating 712. The photodefined grating may be created by exposing the photodefinable polymer to two interfering plane waves, incident at an angle designed to produce an interference pattern of a desired period within the polymer. The periodic high and low intensity regions of the interference pattern induce periodic refractive index changes via the mechanisms described above. Alternatively a single illuminating beam may be used, transmitted through a phase mask to define the grating. These methods of fabrication are advantageous because the photodefinition process provides adequate modulation of the index of refraction with the desired periodicity. In addition, the waveguide and the grating may be formed in the same processing step, which minimizes the number of processing steps, eliminates registration errors, and thus improves yield and device performance. It should be noted that other techniques for grating fabrication, for instance such other methods known in the art as etching, ablation, molding, embossing, lamination, etc., do not offer this processing advantage. The grating period (typically on the order of the wavelength of light) is selected to achieve Bragg reflection for at least a predetermined wavelength of light 714 propagating in or coupled into the waveguide. Light of wavelength satisfying the Bragg condition is reflected or coupled into another path. In a preferred embodiment, the grating retro-reflects light in the waveguide. Another advantage of the processing method disclosed herein is that additional gratings with different periods or other features may be added after the first grating if required.

The Bragg waveguide reflector may be made thermally tunable by fabricating a heating electrode 716 on the device in proximity to the grating element. When a control element 718 delivers current to the heating element the refractive index of the polymer comprising the grating will change as a result of the thermo-optic effect. The refractive index change of the grating affects the wavelength of light that satisfies the Bragg condition so that a different wavelength is now Bragg reflected in the waveguide. If the process is repeated at another temperature another wavelength will then satisfy the Bragg reflection condition. In this manner the device is tunable because a temperature can be selected to achieve Bragg reflection at a desired wavelength. It should be noted that such a device will normally be operated in a steady state temperature condition so that a single wavelength will satisfy the Bragg reflection condition over a given time interval. In a preferred implementation, the polymer material comprising the grating will exhibit a substantially linear variation of refractive index with respect to temperature (at least within the operating range of temperatures), thus providing linear tunability of the resonant wavelength.

The above discussion considers the formation of a Bragg grating superimposed on a waveguide structure. The same techniques can be used to superimpose a Bragg grating on any integrated optical index of refraction feature. Note also that the Bragg pattern can be exposed onto the stack either before or after, or if permitted by the exposure equipment, concurrently with, exposure of the integrated optics pattern. Preferably but not essentially, the methods described herein are used to pattern the Bragg grating all through the material, rather than through only the core layer.

Fibers

A further application for the present invention of photodefined waveguides is in the creation of graded refractive index polymer optical fibers. A polymer optical fiber preform may be formed according to this invention as follows: a thin capillary or polymer tube is filled with a polymer such as Norland optical adhesive 68, to which have been added two types of photosensitive molecules as described in the preferred embodiment above (alternative material and the criteria for selecting them are described above, and may be applied in this embodiment as well). One end of the tube should preferably be prepared with a transparent window, which may provide a plane or curved end face surface to the polymer filled tube fiber preform. Partial curing of the polymer after the filling step may be carried out using a uniform flood exposure to activate the first type of photosensitive molecule and provides a limited degree of material crosslinking sufficient to provide structural and chemical robustness. This pre cure exposure may be performed through the walls of the tube in which the photodefinable polymer is enclosed.

Photodefinition of the core of the polymer fiber may be achieved by illuminating the polymer within the tube through the transparent window described above. The illuminating radiation should be focused to a spot size comparable with the desired core dimension of the fiber (or alternatively comparable with the desired optical mode dimension) and should be of a wavelength suitable to provide activation of the second type of photosensitive molecule and subsequent preferential curing of the photodefinable polymer.

The incident, focused radiation induces cure in the polymer material closest to the input window, increasing the refractive index of the material. Note that the highest intensity of the incident radiation may be in the center of the focus region if a simple graded index fiber is desired, but more complex intensity profiles, such as a focused mode with a decreased central intensity, may be employed to create more complex refraction index structures.

In the case of single transverse gaussian type (or top hat) mode input where maximum intensity is substantially centralized in the mode, the center of the illuminated volume will experience the highest degree of photoinduced activation of the second type of photosensitive molecules and thus the highest induced crosslinking and refractive index change. As the intensity of the illumination decreases towards the edge of the focused input, the refractive index increase induced in the photodefined polymer will decrease, leading to a graded refractive index profile in the fabricated fiber.

As the material closest to the input window cures, the illuminating radiation may be focused by the induced index change, overcoming the natural diffraction of the focused beam, i.e. taking on the functionality of an optical fiber. As this occurs, polymer material further along the tube/fiber becomes illuminated by the (transversely) spatially varying focused intensity profile of the input illumination, leading to polymerization and index change along the entire length of the fiber, via a self guiding type effect of the input illumination.

After photodefinition and (if desirable) a diffusion bake, a locking exposure should be applied, preferably through the walls of the tube encapsulating the polymer, such that substantially all the types of photosensitive molecules are activated and further refractive index changes with time or illumination are substantially prevented.

Note that after the initial pre-cure, performed to provide chemical and physical robustness, it is in principle possible to cut a length of preform and then subsequently perform the core defining exposure, without the need for placing a transparent window against the cut end of the preform. The use of refractive index matching fluids, which are well known to those skilled in the art, required to overcome roughness of the cut end face, provides a suitable means of launching the core defining exposure radiation into the physically stabilized preform.

With such a photodefinable polymer material as the core or cladding layer of an optical fiber (e.g. the cladding of a silica type optical fiber known in the art), it is also possible to photodefine a refractive index modulation grating which can be used to interact with the guided mode of the structure. A grating structure may be formed by illuminating a fiber from the side using two (or more) interfering radiation beams set at an angle determined to provide an interference pattern in the polymer of a desired periodicity. The periodic high and low intensity regions of the interference pattern produce periodic index modulation via preferential curing within the photodefinable polymer. Alternatively, the polymer may be illuminated by a single beam transmitted through a phase mask, as is utilized with UV excimer laser to write diffraction gratings in the core/claddings of germanium doped silica optical fibers.

Such gratings may be used as Bragg filters to retro-reflect desired wavelengths within the fiber or to couple light for instance between the core and cladding modes of the structure. By producing a predefined index modulation strength and length of grating, the reflection efficiency and bandwidth of the grating can be designed to meet the needs of particular devices, such as the gain flattening gratings now being used in erbium doped optical amplifiers systems for WDM communications.

Multilayer Photodefined Waveguides

With an arbitrary number of noninteracting types of photosensitive molecules in different layers of the structure, a network of interacting and/or noninteracting waveguides may be created by a series of photodefinition steps. Different exposures at different wavelengths define waveguides in different layers at different vertical positions in the stack. Isolation layers between the waveguide layers can provide noninteracting structures. By making even the isolation layers photodefinable, it is possible to link non-interacting waveguide networks at certain predefined points using a photo exposure process.

Thus, a single optical input at one vertical level may be split to one or more outputs at different horizontal and vertical positions. This could in principle provide for more compact structures for certain optical devices as the device can be multiplexed vertically as well as horizontally or linearly.

An expanded embodiment of the present invention is in application to multi-layered (3-dimensional) optical waveguide structures and networks. In this sense, the FIG. 2 embodiment described above implements only a simple form of the present invention, where the optical waveguide mode(s) is(are) contained largely in a single layer of the multi-layer optical stack structure, and in general only one of the layers contains material responsive to the inventive photodefinition waveguide fabrication process.

Figure 5:
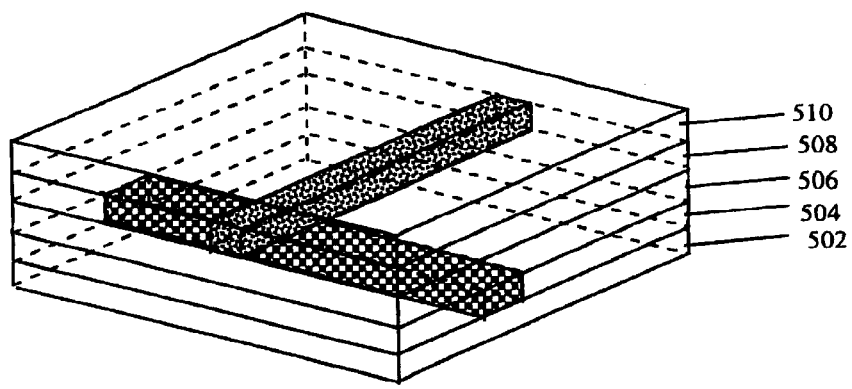
FIG. 5 illustrates a multilayer optical stack incorporating two core layers.

It is however possible to expand the multi-layer optical stack beyond the three generally required layers described above (lower cladding, core and upper cladding). Such a structure is shown in FIG. 5. Here we have a lower cladding layer 502, a first core layer 504, an isolating or buffer layer 506, a second core layer 508 and an upper cladding layer 510. In this embodiment, each of the layers of the optical stack contains at least a first type of photosensitive molecule to initiate curing of the layer in response to the application of radiation, e.g. UV light. Note that separate layers may contain the same or different types of photosensitive molecule such that curing of separate layers occurs with the application of the same or different wavelengths of light. The first and second core layers additionally each contain a second type of photosensitive molecule, preferably a different type of molecule in each of the two core layers, and preferably the isolation/buffer layer also contains a second type of photosensitive molecule, that is different from the types contained in either the first or second core layer.

The multi-layer optical stack of FIG. 5 is fabricated in a way analogous to that set forth with respect to FIG. 2. The lower cladding layer 502 is deposited, e.g., by spinning, on the substrate (not shown), which may be glass, silicon or polymer. This layer 502 is then at least partially cured by exposure to actinic radiation which activates the first type of photosensitive molecule and provides at least partial crosslinking of the polymer material. As with the previous examples, the at least partial cure may be applied thermally, radiatively, or by other means, not only via photo exposure. At least partial curing is required to provide chemical and physical stability sufficient to allow the deposition (which may again be achieved using a spinning technique) of the first core layer 504 for those materials that do not display the characteristics in the as-deposited state. This first core layer 504 is then partially cured by activating the first type of photosensitive molecule contained within (which may be the same molecule contained within the lower cladding layer 502). The partial curing process does not activate the second type of photosensitive molecule in the first core layer 504, which will later be used in the photodefinition process. The partially cured first core layer 504 is chemically and physically stable enough for the isolation or buffer layer 506 to be deposited on top and partially cured by activating its first type of photosensitive molecule. Again this partial cure does not activate the second type of photosensitive molecule which will later be used in the photodefinition process. The second core layer 508 is similarly deposited and partially cured on top of the buffer/isolation layer 506, followed by deposition and at least partial curing of the upper cladding layer (510).

The optical multilayer stack constructed as described above and as shown in FIG. 5 now contains two photodefinable waveguide core layers 504 and 508 separated by an isolation/buffer layer 506 which may also be photodefined. Because the different layers contain different species as their second type of photosensitive molecule, the photodefinition of one layer can occur independently of the others (provided that the photodefinition exposures are performed in the appropriate order considering the activation wavelengths and spectra of the second types of photosensitive molecules involved). Thus we can use a first patterned radiation exposure to cause patterned activation of the second type of photosensitive molecule in the first core layer 504, resulting in crosslinking/cure, diffusion and refractive index changes (as described above) according to the pattern of the exposure. This creates the first waveguide network in the first core layer 504. If the isolation/buffer layer 506 is not photodefined, and the refractive indices of the materials of the multi-layer optical stack have been correctly chosen, the first waveguide network in the first core layer 504 is completely isolated from the second core layer 508. Using a second patterned radiation exposure we can now define a second waveguide network in the second core layer 508, again as a result of patterned activation of the second type of photosensitive molecule in the second core layer 508 and the resulting crosslinking/cure and diffusion. These two waveguide networks may be completely isolated, providing propagation at any angle to each other with no interaction or crossing losses, (assuming the evanescent tails of the propagated modes are sufficiently attenuated by the thickness of the buffer layer 506), no matter how many waveguides in the first core layer are crossed by a waveguide in the second core layer 508.

Figure 6:
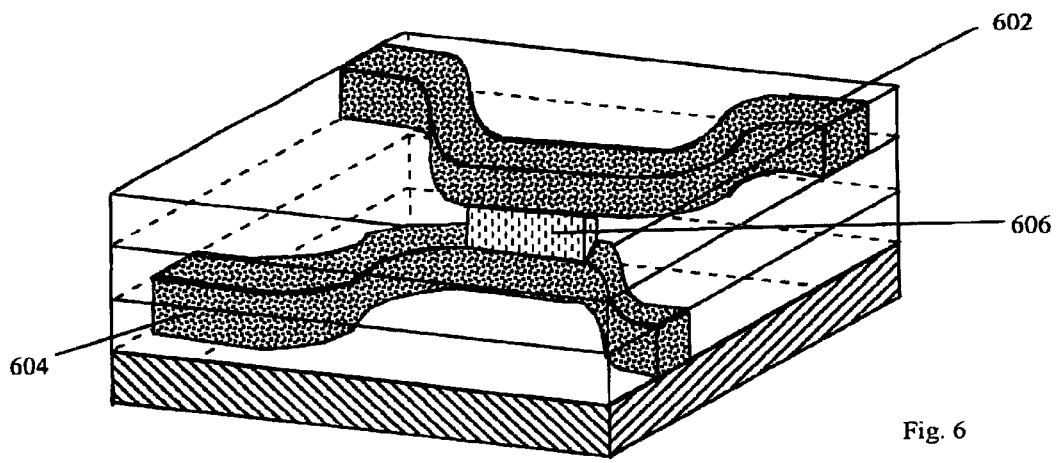
FIG. 6 is a magnification of a selected region of FIG. 5 illustrating coupling between the two core layers.

The second type of photosensitive molecule in the buffer/isolation layer 506 serves to allow us to photodefine regions in which the first and second waveguide networks may interact. For example, in the region shown in FIG. 6, a waveguide segment from each of the first and second networks 602 and 604 respectively run substantially parallel and substantially directly over one another. By using a patterned exposure to activate the second type of photosensitive molecule in the buffer layer in this region 606, the index of the buffer layer is increased, and the isolation between the waveguides reduced or eliminated. This forms a vertical parallel or directional coupler, which, with the appropriate choice for the refractive indices and thicknesses of the (photodefined regions of the) first and second core layers and the buffer layer, enables light to be coupled between the waveguides in the first and second waveguide networks. The efficiency of the coupling is determined by the overlap integral between the optical modes of the waveguides in the two networks, and the length of the coupling region 606.

Subsequent to the final photodefinition step, a locking step is applied to prevent future unwanted index changes by uniformly exposing the multilayer structure to multiple wavelengths to activate substantially all the remaining types of photosensitive molecules. Note that diffusion enhancement bakes may be applied at any appropriate point in the multilayer photodefinition process, e.g., between exposures or after all exposures, but before the lock up process, in order to optimize the waveguide fabrication process.

Thus, the structure shown in FIG. 5 enables the creation of isolated networks of optical waveguides propagating at different vertical levels within an optical multi-layer structure, with the additional advantage of being able to controllably introduce interaction or coupling between the waveguide networks in certain defined areas. All the waveguide fabrication and coupling inducement is performed using exposure of the pre-fabricated optical multilayer stack to patterned illumination at different wavelengths to effect photodefinition in the different layers.

Commercial applications for this invention include communications, display routing or touch screen applications, where optical waveguides are required to cross large numbers of other waveguides to reach their final destination, preferably with no excess loss as a result of the crossing.

Additionally, the ability to take light into the multilayer structure at a single point and then distribute it both in the plane of the structure and into multiple planes vertically within the structure offers the prospect of increasing device integration and shrinking device size for a given functionality (e.g., 1-N splitters whose minimum length is limited by the need for cascaded/branches can now be spread in both horizontal and vertical dimensions to yield a more compact overall structure).

Active Devices in Multilayer Structures

In an alternate design, a grating assisted directional or parallel coupler may be fabricated whereby a photodefined grating may be created in the buffer layer using an exposure of two interfering beams or of a single beam through a phase reversal mask pattern. The modulated refraction index of the photodefined grating provides a k-vector to quasi phase match the optical coupling between the two waveguide networks. With correct choice of mode propagation constants, waveguide dimensions, buffer layer thicknesses, grating period and index modulation, the coupling efficiency and wavelength bandwidth of the vertical grating assisted directional coupler can be designed to meet predetermined values. Such a device may be tuned thermo-optically using a thin film (or bulk) heater to alter the temperature of the polymer in the grating assisted directional coupler, thus altering the refractive index and by virtue of thermal expansion, the physical period of the grating. The combination of physical and optical period changes from these effects results in a shift in the wavelength peak of the coupling efficiency curve between the two waveguide networks. Thus it is in principle possible to turn on or off the coupling between the two networks at a desired wavelength by using a control signal to the heater.

In principle, with the appropriate choice of index and period, it is possible to provide contra-directional coupling in such a grating assisted device, that is for the mode coupled from waveguide A to waveguide B to be traveling in the opposite direction in waveguide B.

Note that it is also possible to build a directional coupler or grating assisted coupler (forward or contradirectional) that acts between two waveguides in the same core layer to distribute light between separate waveguides in the same network. In addition, each waveguide network in the multilayer waveguide structure may comprise any number of active or passive components, such as switches, attenuators, reflection/transmission gratings, couplers, arrayed waveguide gratings, interference sections etc. as required to provide the desired functionality for the device.

Figure 12:
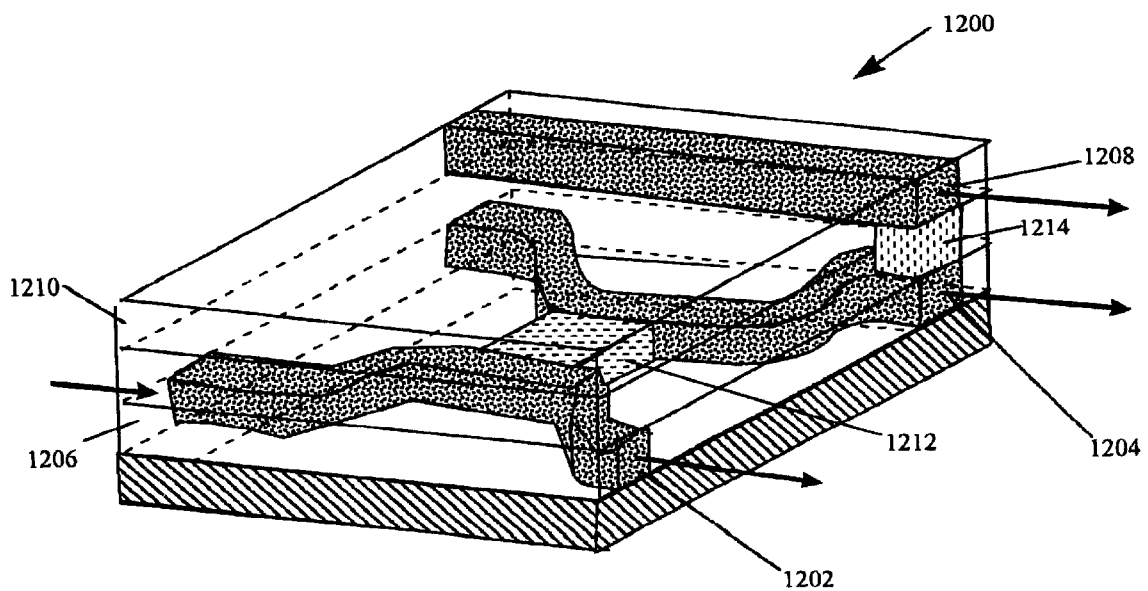
FIG. 12 illustrates another embodiment of a multilayer optical stack incorporating two core layers.

FIG. 12 illustrates a device 1200 in which there are two isolated networks of optical waveguides propagating at different levels within an optical multilayer structure, shown as an upper network and a lower network. Optical energy entering the device 1200 may be controllably distributed to exit at output ports 1202 or 1204, within the plane of the lower network 1206, or at output port 1208, within the plane of the upper network 1210 by activating the appropriate couplers or switches 1212, 1214 within and between the networks.

Interlinking of the waveguide networks or separate layers can improve the functionality and decrease the required dimensions of the overall device by enabling stacking of components in the vertical dimension while retaining an integrated structure for the device.

Figure 11:
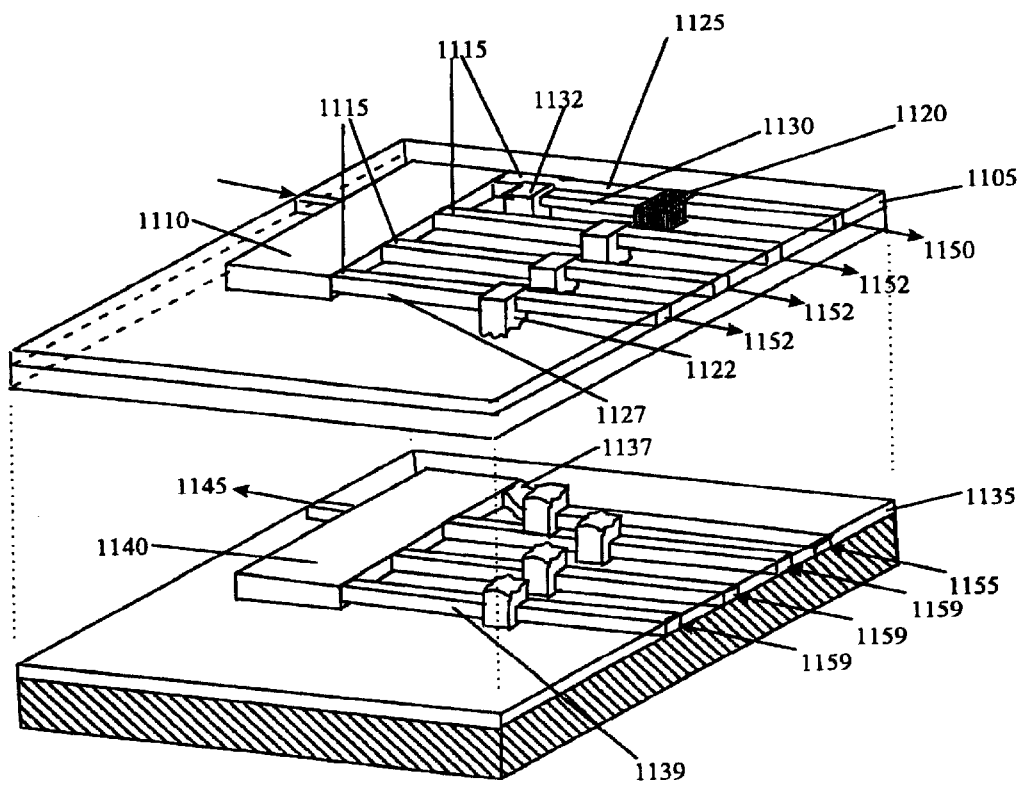
FIG. 11 illustrates schematically an add-drop mux-demux for WDM communication systems.

An example application of the multilayered waveguide structure enabled by this invention is an add-drop muxdemux for WDM communication systems, illustrated schematically in FIG. 11. In this example, a multi-channel, multi wavelength WDM signal is input to a waveguide in the core layer 1105 that is then passed into an arrayed waveguide grating wavelength demultiplexing element 1110; where the wavelength channels of the WDM signal are spatially separated and output to different channel waveguides 1115. The wavelength channels are propagated further in core layerl 105 until they each reach a (for instance) thermo-optically tuned/switched grating assisted contra directional coupler 1120, 1122. The coupler 1120 connects two waveguides in core layer 1105, coupler 1122 connects one guide in core layer 1105 and one in core layer 1135. When the thermo optic tuned grating assisted contra directional coupler 1120 is activated to deflect the wavelength propagating in channel 1125 (e.g. the appropriate control signal is supplied to a heater in thermal communication with the grating assisted contra directional coupler 1120) the WDM signal in the waveguide 1125 is coupled into waveguide 1130. A subsequent vertical directional coupler 1132 is required for the signal to reach waveguide 1137 in layer 1135, followed by propagation to the arrayed waveguide grating 1140, wherein it is recombined with other wavelength channels to provide the WDM output signal 1145.

When the thermo-optic tuned grating assisted contra directional coupler 1122 is activated to deflect the wavelength propagating in channel 1127 (e.g. the appropriate control signal is supplied to a heater in thermal communication with the grating assisted contra directional coupler 1122) the WDM signal in the waveguide 1127 is coupled into waveguide 1139 in core layer 1135. The signal may now be propagated directly back to a second arrayed waveguide grating 1140, wherein it is recombined with other wavelength channels to provide the WDM output signal 1145.

If the grating assisted contra directional coupler 1120, 1122 is not activated for a given channel, that channel is carried to the drop output 1150, 1152 on layer 1105 where it may be sampled to extract data or simply discarded.

New input data for the wavelength channel is provided at the add input 1155, 1159 on layer 1135 and then propagated to the arrayed waveguide grating to be combined into the WDM output signal 1145.

It will be apparent that this structure can be further expanded by the incorporation of further core layers with further different (or the same) photosensitive molecules separated by respective isolation/buffer layers.

Advantages of Flexible Substrate

Since polymer films are, by nature, thin and fragile, some sort of carrier or substrate is necessary to move product through the manufacturing cycle. This substrate, as indicated earlier, can be glass, silicon, or some other rigid material. Rigid materials used as carriers, however, dictate that the manufacturing facility handle discrete, and possibly fragile, panels. Scalability to large sizes becomes problematic, both from a technical and from an economic perspective. In the latter instance, experience with existing flat panel display technologies shows how the cost of batch manufacturing equipment rapidly escalates with increasing device size and how potential products can quickly price themselves out of the market. Thus, for polymer-based photonic devices, a better, more natural, choice for the carrier is a continuous, flexible substrate, or "web." Compared to photonic devices produced on a rigid carrier, those fabricated on a flexible web using roll-to-roll processing inherently have the potential for advantages in terms of manufacturing cost and the required capital investment. At the same time, the potential for scalability and ruggedness is vastly improved. These advantages are further enhanced if existing technology and equipment can be utilized.

With current prior art device fabrication capabilities, if a web-based manufacturing processes is to be utilized, each layer of a polymeric device must be patterned, if required, before the next layer is coated or laminated over it. An advantage of the current invention is that it enables a complete optical multilayer stack to be coated on a flexible substrate without requiring intermediate patterning steps between layer depositions, and in such a way that allows substantially all patterning steps to be carried out after the complete multilayer structure has been fabricated. Hence rolls of multilayer structure can be prepared in advance, and the photodefinition waveguide patterning and subsequent activator (distinct from the photosensitive molecules utilized for photodefinition) or feature patterning can be performed at a later stage. If desired, the continuous roll of multilayer structure may be cut into predetermined lengths, prior to the patterning to produce the individual components or devices desired. By later stage, we mean either immediately following completion of the multilayer structure, or after some delay, or in the extreme, several years later. The present invention provides an ability to perform the optical multilayer structure fabrication and the patterning processes at different locations at selected times, in either continuous form or batch processing modes.

For maximum compatibility with web manufacturing, these device patterning steps should preferably not entail process conditions, such as high vacuums or elevated temperatures, which are difficult to implement on a continuous form. As a result, certain patterning technologies, such as photodefinition, laser ablation and screen printing, are ideally suited to be part of web-based photonic manufacturing operations. However, commercial processing capability exists for vacuum coating of metallic and non-metallic thin films onto roll or web substrates, so the preference for non-vacuum processes should not be interpreted as a requirement.

Rather than cutting the continuous roll of multilayer structure into predetermined lengths, it can be processed as a roll, and subsequently cut if so desired. The roll can be cut (lengthwise and/or widthwise) to produce narrow rolls and/or shorter rolls/pieces. The cutting process can be performed after one or more intermediate processes, or after the final process. Hence optical components or devices of substantial size can be created, without the restrictions imposed by other waveguide patterning techniques such as for example RIE, where the device size is presently limited by the vacuum chamber of the RIE machine itself. Very large display screens, for example, can be produced utilizing these roll-roll processing techniques.

As a result of the present invention the fabrication of an optical device may be carried out utilizing a two stage operation in which the web of multilayer structure is made first (perhaps in multiple steps), and then utilized in the optical device fabrication machine embodying the waveguide photodefinition process. This entire fabrication process may however alternatively be practiced as a continuous operation, consisting of both fabricating the multilayer structure in a continuous web, and fabricating the device in question, including photodefining the required elements.

Methods

Figure 8:
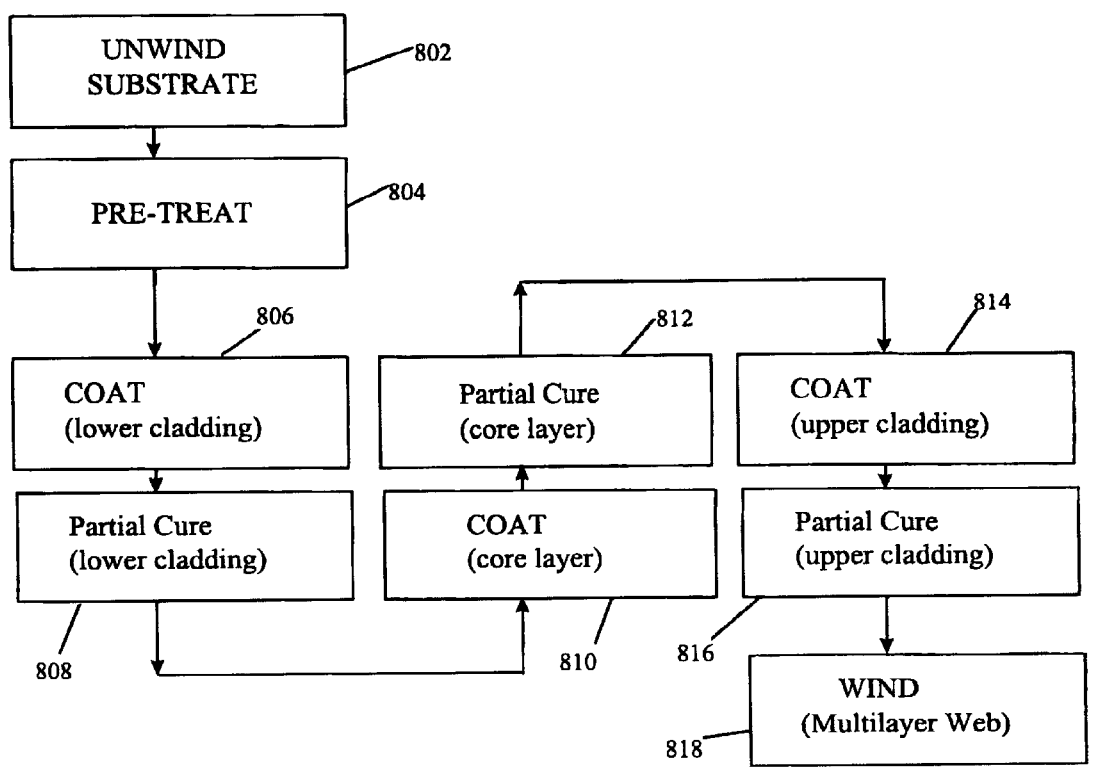
FIG. 8 is a flow diagram illustrating how a multilayer structure can be fabricated on a web.

FIG. 8 is a flow diagram illustrating an embodiment of a first process in which a web of multilayer structure is created. The structure of the resulting multilayer stack is shown in cross-section in FIG. 2b and represents a simple embodiment capable of providing patternable waveguide confinement in the plane of the multilayer structure. A web substrate roll of material such as Kapton or Mylar, for example, is placed on an unwind roll. In step 802, the web substrate is then unwound and moved utilizing a mechanical system of rollers such that it can be coated and treated as required to create the final product, a web of a multilayer structure. The speed at which the web substrate moves may be anything from less than a few meters per minute to hundreds of meters per minute.

When initially unwound, the substrate passes under a pre-treat station or stations (step 804). These stations prepare the substrate to accept the first layer of the multilayer structure, for example the lower cladding layer, by, for example, cleaning the substrate and then providing a corona discharge or plasma treatment to provide an adhesion layer. The pre-treat station may comprise a coater, which applies the cleaning solution and then the adhesion layer. It may also comprise a unit that applies another technique or treatment, such as electrostatic elimination of dust.

Once pre-treated, the substrate moves under a coater (step 806) or conveyance means, which applies a layer of predetermined thickness of the lower cladding material onto the substrate. The lower cladding material formulation may reside in a hopper or multiple hoppers in the form required for deposition, that is dispersed, dissolved or filtered as desired. Continuous feedback control may be installed to monitor and maintain the thickness of the deposited layer. Further, the viscosity of the material to be deposited may be monitored and continually maintained at a preset value by the addition of solvent, or other viscosity controlling-substance, to replace any solvent lost by evaporation from the hopper. The conveyance means may be in the form of face contact or non-contact rollers, blades, knives, or any other type of conveyance means known to those skilled in the art such as slot die.

The lower cladding coated substrate is then provided with at least a partial cure (step 808) to provide mechanical and chemical stability to subsequent coating and processing steps. In the case of the UV cured material described in the previous embodiment, the partial cure may be provided by exposure to UV/visible radiation to activate the first photosensitive molecules. Alternate material systems may utilize other wavelengths or thermal processes to provide the at least partial cure.

A core layer of a predetermined thickness is then applied to the at least partially cured lower cladding (step 810). If required, the core layer is also provided with a partial cure (step 812) to provide mechanical and chemical stability to subsequent coating processing steps. As for the lower cladding layer, depending upon the material system, various wavelengths or thermal processes may be utilized to provide this partial cure, examples being exposure to UV/visible radiation, to activate the first photosensitive molecules.

Finally, for the purposes of the embodiment being described, an upper cladding layer of a predetermined thickness is applied to the core/lower cladding coated substrate (step 814). As for the previous layers, depending upon the material system, various wavelengths or thermal processes may be utilized to provide this partial cure (step 816), examples being exposure to UV/visible radiation, to activate the first photosensitive molecules.

Other material layers, including adhesion promotion material, hermetic seal material and additional optical layers may also be deposited in this manner. The series of steps described may be carried out as many times as required to achieve the number of layers desired in the final multilayer structure. In addition, other processes may be used to deposit other layers such as barrier or electrode metal layers by evaporation or sputtering or plasma enhanced chemical vapor deposition (PECVD). Following complete deposition of the multilayer stack and winding (step 818), there is thereby produced a wound roll of optical multilayered material, which may then be stored, shipped, or immediately processed further.

As described, the coating stations have been specified as individual stations; however, more than one layer of the multilayer structure may be applied at one time by one coating station, or each layer may be applied by one station from different sections thereof. There are many methods by which the many layers of the structure can be coated onto the web substrate, including one in which the web substrate is caused to pass through the same coating station numerous times, but each time a different coating is applied. Other methods to achieve the goal of the multilayer structure will be apparent to those skilled in the art. In particular, it may be desirable to coat polymer materials in a solventless form, where the viscosity of the monomer has been tailored to allow coating of the desired layer thickness. In this approach there is no need to provide for solvent evaporation during deposition. For certain materials that exhibit sufficient as-deposited chemical and structural stability, there is no requirement for a pre-cure process, and the multilayer stack fabrication process consists only of deposition steps, without intervening curing steps.

It will be apparent that if the full or partial cure of any particular layer is required, the coating station arrangement is designed to accommodate this step, hence allowing the repetitive coat and partial cure process described herein to be attained.

Figure 9:
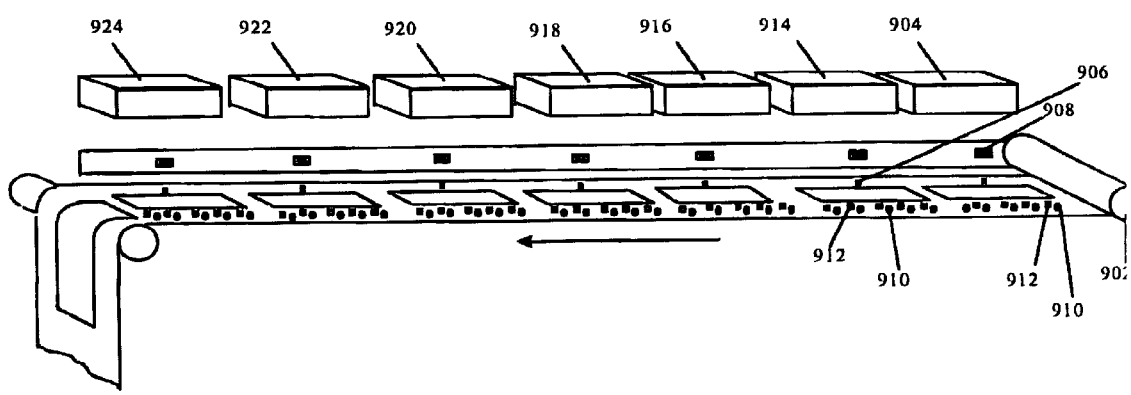
FIG. 9 illustrates schematically a "conveyor belt" type fabrication process for further processing a multilayer structure fabricated on a web.

FIG. 9 illustrates schematically a fabrication process, taking a roll of optical multilayered structure according to this invention, a web 902, photodefining features in it, and then further fabricating it to define the additional features of the optical device of this embodiment. In this embodiment we shall consider the device to be one in which thermo-optic (TO) reflection switches (total internal reflection or partial internal reflection switches, for example), grating switches or other optical waveguide switches that are known in the art, are used as a basis for a flexible optical display panel. Display architectures of this general type are disclosed, for example, in U.S. Pat. No. 5,544,268 to Bischel, et al. and in U.S. Pat. No. 5,009,483 to Rockwell, both of which are incorporated by reference herein.

Figure 10:
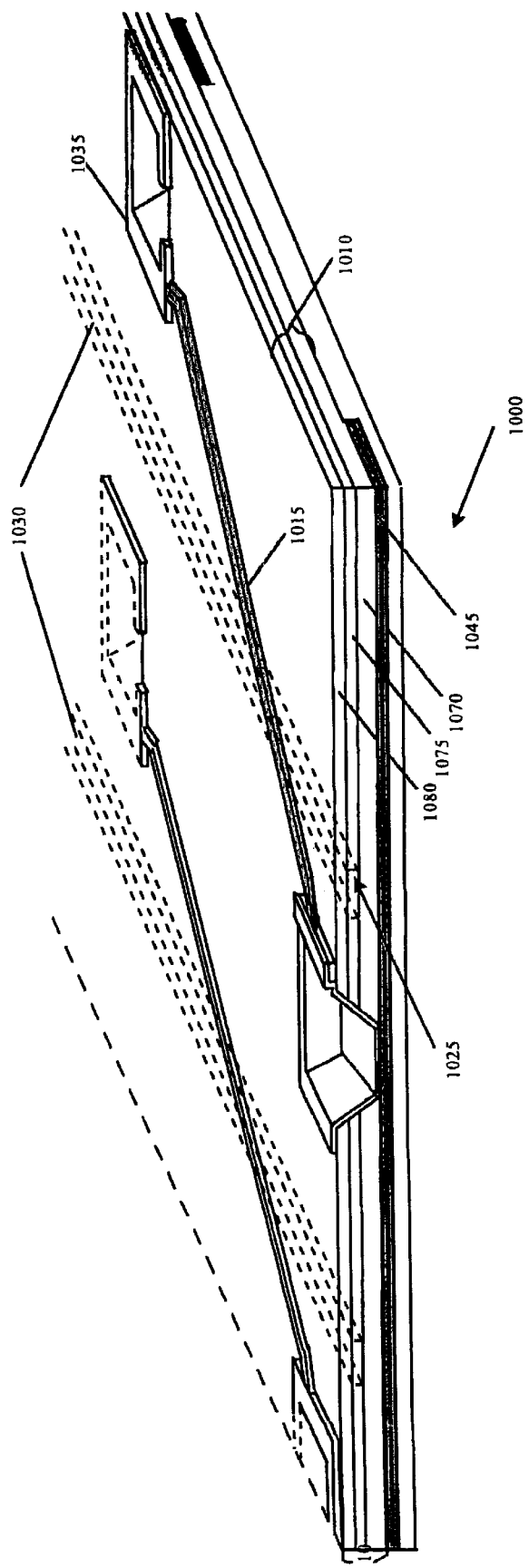
FIG. 10 illustrates schematically an optical waveguide display system incorporating applicators and electrical interconnect vias.

FIG. 10 illustrates an exemplary portion 1000 of a flexible optical display panel that may be fabricated by this process. Portion 1000 consists essentially of an electrical activation layer 1015, an optical waveguide structure 1010, and an electrical distribution layer 1045 which in this example also forms the substrate. Optical waveguide structure 1010 includes lower cladding layer 1070, core layer 1075, and upper cladding layer 1080. Light 1025 is coupled from an optical source, for instance a laser diode array, into the optical waveguide structure 1010, which contains channel waveguides 1030 forming the rows (or columns) of the display. Light continues to propagate along the waveguides until it is redirected from the waveguides at specific locations due to the influence of applicators in the electrical activation layer 1015. When activated, the applicators cause the light propagating along the waveguide to be deflected from the waveguide 1030, and directed towards a pixel 1035, which it enters, ultimately redirecting the light out of the substrate and toward the viewer. The pixel is filled at least partially with a medium containing a re-radiator material, such as a phosphor, which provides for conversion of the input light to the light ultimately observed by the viewer. A re-radiator material may be any single or multi-component material that alters the properties of input light and from which output light emanates. The applicators comprise conductive elements located on or in the surface of the optical waveguide structure 1010 and in proper orientation to the waveguides 1030 running under them.

The applicators, pixels and waveguides are examples of what are referred to herein as "features". Since the invention applies in many fields aside from displays, for the purposes of this explanation, a feature is any distinguishable structure which serves some useful purpose, for example, a feature may have the purpose of aiding in the creation of a display or a communication device, providing the elements which make up the display itself. Other examples of features include, but are not limited to, routers, tapers, vias, and optical distribution structures etc. Many of the features referred to herein are integrated optical index of refraction features. An "integrated optical index of refraction feature" is a feature which confines, guides and/or processes optical signals propagating within the thin film, but excludes holographic features, which process optical energy incident on the film rather than propagating within the film.

FIG. 9 illustrates schematically an unwind station 902 at which a roll of continuous multilayer structure of a width sufficient to permit the production of at least the required number of rows of the optical device, is rotatably supported. The number of rows required may range anywhere from one to many, depending upon the ultimate size of the device in question, in this particular case the number of rows is one. The multilayer structure from the supply roll initially passes through a tension control unit (not shown) and then may pass through a registering unit 904, one of the purposes of the registering unit 904 being to enable the ready and proper placement of the multilayer structure on the fabrication belt, enabling the web to run squarely on the rollers. Alternatively, the web may be held in place via other means, for example via a vacuum hold approach.

The registering unit 904 provides register control elements 906 on the device web which may be in the form of punched holes, or in the form of suitable indicia printed on the web. These register control elements 906 are later detected at various points along the length of the web and via a straightforward mechanical alignment system, or other such feedback mechanism, ensure that the web is correctly placed on the fabrication belt.

The registering unit 904 may also provide for registration of the web with the subsequent feature creation devices and/or alignment with the same, the aim being to control the operation of the feature creation devices by the coaction of creation elements 910, 912 provided on the web and a scanning device 908 located along the path of feed of the web. There are provided on the web a set of feature creation elements 910 for registering the position of the web with the feature creation devices, these being one of such elements for each device and each of such elements being associated with a device. There may also be provided on the web separate device control elements 912 for controlling the operation of the feature creation devices.

If the control elements are to be applied to the multilayer structure in the form of printed indicia, such indicia may be visible to the human eye, or to detecting means under ambient light or light of a given wavelength, or such indicia may be invisible to the human eye or to detecting means under ambient light, but visible under a light of a given wavelength. Such indicia also may be composed of a combination of such visible and invisible indicia, and whether visible or invisible as aforesaid may be detectable by other means such as optical-electrical and magnetic-electrical detecting means. Thus, for a given product luminescent ink that would emit red light could be applied to the product.

It will also be understood that the feature creation elements may be placed on the web in non-aligned relation with the register control elements so that in situations where it is considered desirable two scanning devices may be employed: one to control the registration of the web roll on the fabrication belt and the other to control the registration of the web with the feature creation devices, for example. It will also be understood that these elements may be all applied to the web initially as described, or dispersed within the creation of various features yet to be described.

With the foregoing in mind and assuming that the direction of roll feed is to the left, as viewed in FIG. 9, in the operation of the apparatus, the web roll is fed by the web feeding means in a step-by-step fashion. The step-by-step movement imparted to the multilayer structure by the multilayer structure feeding means may be controlled by a scanning means 908, which, at each occasion when a register control mark 906 is scanned thereby, causes a signal to be sent to the multilayer structure feeding means to continue or stop the feed of the multilayer structure.

If the scanning device 908 detects a feature creation element, it will responsively send a signal to cause the initiation of the feature creation device as aforesaid. Once the last feature creation element 910 has been detected, on the display being scanned, the electrical circuit is switched to control the feed rolls of the feeding means and the feature creation device. When the scanning device now detects the device control element 912, it will simultaneously stop the feed rolls and actuate the feature creation device to imprint or process the multilayer structure in the given area portion of the display during the dwell of the multilayer structure. The circuit is constructed so that if the scanning device 908 does not send a signal as a result of its detection of a device control element 912 within a given period of time after such signal should have been received, that is after receipt of detection of feature creation element 910, the circuit operates to stop the machine. It will be apparent that depending upon the feature creation device and its function, it may be possible to have the web continually moving whilst applying the feature in question, movement of the web may not have to be stopped.

The feature creation devices are unique to the device in question, and will be described now in relation to the feature creation devices that may be desirable for manufacturing the flexible display panel illustrated in FIG. 10. It will be assumed that the multilayer structure in the form of the web 902 comprises a substrate (which doubles as the electrical distribution layer 1045), a lower cladding layer, core layer and upper cladding layer only at this stage.

The first feature creation device required may be a photodefinition device 914. For example a photodefinition source mounted above the multilayer structure may incorporate a bulb for providing the desired wavelength of, for example, ultraviolet light. If projection lithography is utilized, the light beams created by the bulb would be directed through a mask and lens system and the beams concentrated into the areas required to create the optical waveguide. Alternatively, contact lithography or other techniques known to those skilled in the art may be utilized, some of which may necessitate employment of a waveguide mask. The ultra-violet light passes through the upper cladding layer of the web and to the core layer. After a predetermined time the photodefinition source is deactivated, and the web is moved on until the next register control element stops movement of the web. Alternatively a laser type light source can be used as a focused beam and scanned across the web to create the desired waveguide pattern. Eventually the next element activates the next feature creation device. The next feature creation device 916 may be the mere provision of a means to fully cure, bake or expose the defined waveguides for a predetermined time, under predetermined conditions as previously discussed. The functionality of the photodefinition device is to create the optical waveguide according to the above described embodiment of this invention, by exposing the previously deposited fabrication multilayer polymer optical structure.

The following feature creation device 918 may be one which defines the applicators in the electrical activation layer 1015. Definition of the applicators may comprise a second lithographic process, requiring uniform deposition of a metal layer, followed by coating with a photoresist, exposure, developing and etching to create the metal applicators. These applicators can be automatically aligned to the waveguides already created by ensuring careful alignment of the elements 910,912 and the associated feature creation device 918. As discussed 918 comprises the fabrication ability to provide all the steps discussed, however it will be apparent that in practice, these steps may be provided by discrete feature creation device units.

The ablating device 920 (for example, an excimer laser ablation system) follows by which the holes through the optical waveguide structure 1010 are fabricated to enable connection of the applicators 1015 on the surface to the electrical conductors 1040 in the electrical distribution layer 1045, and/or recesses forming to accept the later phosphor deposition. 922 is a metallization step, in which the holes and recesses that have been created are metallized, followed by a lithography step in which the metallization is removed from the switches in order to eliminate subsequent electrical shorting, and metallization is removed to allow optical energy to pass from the waveguide into the recesses formed to accept the phosphor deposition. Once again, conventional lithography methods may be employed, including for example the steps of depositing photoresist, baking, developing and patterning by dry etching for example. Metallization of the side walls and bottoms of the pixels can be used to form an electrical coupling path in the pixel. The final steps are the deposition of phosphor 924 (for example, by printing) and then the cutting of the web (not shown), cutting the web to define each individual flexible display panel.

It should be noted that a final thermal or UV treatment may be required to lock all the photosensitive molecules up and ensure that no further reactions occur which may alter the mechanical and chemical nature of the display panel. This final treatment may occur at any stage in the processing subsequent to the photodefinition, either before or after the web had been cut to define each individual flexible display panel.

As before, it should be recognized that the foregoing description concerning the number and ordering of process operations, and series of operations, sets forth one exemplary method for constructing one embodiment of the invention. Numerous alternatives to the aforementioned process sequence, as well as partial performance of certain operations or series interlaced with partial performance of other operations or series, exist and are within the contemplated scope of the invention. In addition, additional layers may be desired in the fabrication of such a device, these additional layers could be the addition of a barrier layer (for example a hermetic seal), a filter layer, or any other such layer.

The above explanation has assumed that the features are created at predetermined locations along the length of the web. However additional device registry marks could be fabricated on the roll, these marks registering the start and finish of the individual devices, in the example given, marking the start and finish of a display. By ensuring the registry of the start and finish of the display, one can enhance alignment of the features that are subsequently created by ensuring there is a relationship between the registry of the start of the display and the registry of the feature creation devices.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, whereas the above description discusses how web-based processing of a prepared stack can be used to photodefine optical features, it will be appreciated that in other embodiments the prepared optical stack can be provided either on a rigid support or as a pre-cut portion of a roll. Such a stack can be inserted into photolithographic equipment which performs one or more of the processing steps in-situ. If more steps are required thereafter, the partially-completed plate can then be removed to another piece of equipment which performs one or more further processing steps in-situ. These variations and others are intended to be included in aspects of the invention. The embodiments described herein were chosen in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A radiation-definable material comprising a first layer, a second layer above said first layer, and a third layer above said second layer, wherein said first, second and third layers each comprise polymers containing unactivated first photosensitive molecules which activate polymerization in response to incident optical energy of a first wavelength, and wherein said polymer in said second layer further contains a greater concentration by volume of unactivated second photosensitive molecules than does said first and third layers, said second photosensitive molecules activating polymerization in response to incident optical energy of a second wavelength, said first photosensitive molecules being less susceptible to activating polymerization in response to incident optical energy of said second wavelength than are said second photosensitive molecules, and said second photosensitive molecules being less susceptible to activating polymerization in response to incident optical energy of said first wavelength than are said first photosensitive molecules.

2. A material according to claim 1, wherein polymerization activated by said second photosensitive molecules in said second layer causes an index of refraction change in said second layer.

3. A material according to claim 1, wherein said first and third layers comprise cladding layers and said second layer comprises a core layer.

4. A material according to claim 1, wherein said first, second and third layers all have the same index of refraction.

5. A material according to claim 1, wherein said material further comprises a fourth layer below said first layer.

6. A material according to claim 5, wherein said first layer has an index of refraction which is greater than that of said third and that of said fourth layer, and wherein said second layer has an index of refraction which matches said third layer.

7. A material according to claim 1, wherein said third layer is transparent to radiation of said first type.

8. A material according to claim 1, wherein said polymer in said second layer is partially crosslinked.

9. A material according to claim 1, comprising one layer which comprises a polymer containing a greater concentration by volume of unactivated third photosensitive molecules than does another layer of said material, said third photosensitive molecules activating polymerization in response to incident optical energy of a third wavelength, said third photosensitive molecules being less susceptible to activating polymerization in response to incident optical energy of said first wavelength than are said first photosensitive molecules, and less susceptible to activating polymerization in response to incident optical energy of said second wavelength than are said second photosensitive molecules.

10. A material according to claim 9, wherein said one layer is said second layer.

11. A material according to claim 9, comprising a fourth layer between said second and third layers, wherein said one layer is said fourth layer.

12. A material according to claim 1, wherein said first layer comprises a mechanical support for said second and third layers.

13. A material according to claim 12, wherein said mechanical support is flexible.

14. A material according to claim 1, provided as a roll.

15. A method for forming an optical material, comprising the steps of:

forming a second polymer layer above a first layer, said second layer including both first and second types of molecules, said first molecules being more susceptible to activating polymerization in response to incident radiation of a first type than incident radiation of a second type, and said second molecules being more susceptible to activating polymerization in response to incident radiation of a second type than incident radiation of a first type;

exposing said second layer to radiation of said first type but not said second type;

forming a third polymer layer above said second layer; and curing said third layer without precluding further activation of polymerization by said second molecules in said second layer in response to incident radiation of said second type.

16. A method according to claim 15, further comprising the steps of:

forming said first layer above a support layer prior to said step of forming a second polymer layer, said first layer comprising a polymer which includes molecules of said first type; and curing said first layer prior to said step of forming a second polymer layer, said step of curing said first layer comprising the step of exposing said first layer to radiation of said first type.

17. A method according to claim 16, wherein said step of forming a third polymer layer comprises the step of including molecules of a third type in said third layer, said third molecules activating polymerization in response to incident radiation of a third type, said first and second molecules each being less susceptible to activating polymerization in response to incident radiation of said third type than are said third molecules, and wherein said step of curing said third layer comprises the step of exposing said third layer to radiation of said third type.

18. A method according to claim 16, wherein said support layer comprises a flexible web.

19. A method according to claim 16, further comprising the step of, after said step of curing said third layer, selectively exposing said second layer to radiation of said second type through one of said first and third layers to form an integrated optical index of refraction feature in said second layer.

20. A method according to claim 19, further comprising the step of, after said step of selectively exposing said second layer to radiation of said second type, exposing said material generally to radiation of said first type.

21. A method according to claim 20, further comprising the steps of, between said step of curing said third layer and said step of selectively exposing said second layer:

winding said material into a roll;

relocating said roll from a first site to a second site; and inserting said roll into web processing equipment which performs at least said step of selectively exposing said second layer.

22. A product made by the method of any of claims 15, 19 and 21.

23. A method for patterning an optical stack, comprising the steps of:

providing a material comprising a support layer, a first layer above said support layer, and a second layer above said first layer, said first layer being more susceptible than both said support layer and said second layer to index of refraction changes in response to incident radiation of a first type;

inserting said material into selective exposure equipment; and selectively exposing said first layer to radiation of said first type through one of said support and second layers to form an integrated optical index of refraction feature in said first layer.

* * * * *